United States Patent
Loren et al.

(10) Patent No.: US 11,977,173 B2
(45) Date of Patent: May 7, 2024

(54) SPOOFING AND DENIAL OF SERVICE DETECTION AND PROTECTION WITH DOPPLER NULLING (SPATIAL AWARENESS)

(71) Applicant: Rockwell Collins, Inc., Cedar Rapids, IA (US)

(72) Inventors: Eric J. Loren, North Liberty, IA (US); Tj T. Kwon, Marion, IA (US); James A. Stevens, Lucas, TX (US); William B. Sorsby, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 18/199,779

(22) Filed: May 19, 2023

(65) Prior Publication Data

US 2024/0019520 A1 Jan. 18, 2024

Related U.S. Application Data

(63) Continuation of application No. 18/198,671, filed on May 17, 2023, which is a continuation-in-part of (Continued)

(51) Int. Cl.
*H04W 56/00* (2009.01)
*G01S 5/00* (2006.01)
(Continued)

(52) U.S. Cl.
CPC .......... *G01S 5/0027* (2013.01); *G01S 13/583* (2013.01); *G01S 13/62* (2013.01);
(Continued)

(58) Field of Classification Search
CPC ......... H04W 56/0035; H04W 56/0015; H04W 56/005; G01S 5/0027; G01S 13/583; G01S 13/62
See application file for complete search history.

(56) References Cited

U.S. PATENT DOCUMENTS

| | | | |
|---|---|---|---|
| 3,025,519 A | 3/1962 | Brown et al. | |
| 4,134,113 A | 1/1979 | Powell | |

(Continued)

FOREIGN PATENT DOCUMENTS

| | | | |
|---|---|---|---|
| CN | 101330448 A | 12/2008 | |
| CN | 101465793 A | 6/2009 | |

(Continued)

OTHER PUBLICATIONS

U.S. Appl. No. 17/233,107, filed Apr. 16, 2021, Eric J. Loren.
(Continued)

*Primary Examiner* — Dominic E Rego
(74) *Attorney, Agent, or Firm* — Suiter Swantz IP

(57) ABSTRACT

A system is disclosed. The system may include a receiver or transmitter node. The receiver or transmitter node may include a communications interface with an antenna element and a controller. The controller may include one or more processors and have information of own node velocity and own node orientation relative to a common reference frame. The receiver or transmitter node may be time synchronized to apply Doppler corrections to signals, the Doppler corrections associated with the receiver or transmitter node's own motions relative to the common reference frame, the Doppler corrections applied using Doppler null steering along Null directions. The receiver node is configured to determine a parameter of the signals and an authenticity of the signals based on the parameter.

20 Claims, 12 Drawing Sheets

Related U.S. Application Data application No. 18/198,152, filed on May 16, 2023, which is a continuation-in-part of application No. 18/196,807, filed on May 12, 2023, which is a continuation-in-part of application No. 18/134,950, filed on Apr. 14, 2023, which is a continuation of application No. 17/534,061, filed on Nov. 23, 2021, now Pat. No. 11,665,658, said application No. 18/196,807 is a continuation-in-part of application No. 18/130,285, filed on Apr. 3, 2023, which is a continuation-in-part of application No. 17/990,491, filed on Nov. 18, 2022, which is a continuation-in-part of application No. 17/957,881, filed on Sep. 30, 2022, which is a continuation-in-part of application No. 17/857,920, filed on Jul. 5, 2022, which is a continuation-in-part of application No. PCT/US2022/024653, filed on Apr. 13, 2022, and a continuation of application No. 17/541,703, filed on Dec. 3, 2021, which is a continuation-in-part of application No. 17/408,156, filed on Aug. 20, 2021, now Pat. No. 11,737,121, and a continuation-in-part of application No. 17/233,107, filed on Apr. 16, 2021, now Pat. No. 11,726,162, and a continuation-in-part of application No. 17/079,175, filed on Oct. 23, 2020, now Pat. No. 11,304,084, and a continuation-in-part of application No. 17/020,231, filed on Sep. 14, 2020, now Pat. No. 11,296,966, which is a continuation-in-part of application No. 16/987,671, filed on Aug. 7, 2020, now Pat. No. 11,290,942, and a continuation-in-part of application No. 16/698,230, filed on Nov. 27, 2019, now Pat. No. 10,999,778, said application No. 17/857,920 is a continuation of application No. 17/534,061, filed on Nov. 23, 2021, now Pat. No. 11,665,658, said application No. 17/957,881 is a continuation-in-part of application No. 17/846,625, filed on Jun. 22, 2022, said application No. 17/990,491 is a continuation-in-part of application No. 17/941,907, filed on Sep. 9, 2022, which is a continuation-in-part of application No. 17/940,898, filed on Sep. 8, 2022, which is a continuation-in-part of application No. 17/857,920, filed on Jul. 5, 2022, said application No. 18/198,152 is a continuation of application No. 18/196,912, filed on May 12, 2023, which is a continuation-in-part of application No. 18/134,950, filed on Apr. 14, 2023, and a continuation-in-part of application No. 18/130,285, filed on Apr. 3, 2023, which is a continuation-in-part of application No. 17/990,491, filed on Nov. 18, 2022, which is a continuation-in-part of application No. 17/957,881, filed on Sep. 30, 2022, which is a continuation-in-part of application No. 17/857,920, filed on Jul. 5, 2022, which is a continuation of application No. 17/541,703, filed on Dec. 3, 2021, which is a continuation-in-part of application No. 17/408,156, filed on Aug. 20, 2021, now Pat. No. 11,737,121, and a continuation-in-part of application No. 17/233,107, filed on Apr. 16, 2021, now Pat. No. 11,726,162, and a continuation-in-part of application No. 17/079,175, filed on Oct. 23, 2020, now Pat. No. 11,304,084, and a continuation-in-part of application No. 17/020,231, filed on Sep. 14, 2020, now Pat. No. 11,296,966, which is a continuation-in-part of application No. 16/987,671, filed on Aug. 7, 2020, now Pat. No. 11,290,942, and a continuation-in-part of application No. 16/698,230, filed on Nov. 27, 2019, now Pat. No. 10,999,778, said application No. 17/857,920 is a continuation of application No. 17/534,061, filed on Nov. 23, 2021, now Pat. No. 11,665,658, said application No. 17/957,881 is a continuation-in-part of application No. 17/846,625, filed on Jun. 22, 2022, said application No. 17/990,491 is a continuation-in-part of application No. 17/941,907, filed on Sep. 9, 2022, which is a continuation-in-part of application No. 17/940,898, filed on Sep. 8, 2022, which is a continuation-in-part of application No. 17/857,920, filed on Jul. 5, 2022, said application No. PCT/US2022/024653 is a continuation of application No. 17/233,107, filed on Apr. 16, 2021, now Pat. No. 11,726,162, said application No. 18/198,152 is a continuation-in-part of application No. 18/196,931, filed on May 12, 2023, which is a continuation-in-part of application No. 18/134,950, filed on Apr. 14, 2023, and a continuation-in-part of application No. 18/130,285, filed on Apr. 3, 2023, said application No. 18/198,152 is a continuation-in-part of application No. 18/196,765, filed on May 12, 2023, which is a continuation-in-part of application No. 18/134,950, filed on Apr. 14, 2023, and a continuation-in-part of application No. 18/130,285, filed on Apr. 3, 2023, said application No. 18/198,152 is a continuation-in-part of application No. 18/196,944, filed on May 12, 2023, which is a continuation-in-part of application No. 18/134,950, filed on Apr. 14, 2023, and a continuation-in-part of application No. 18/130,285, filed on Apr. 3, 2023, said application No. 18/198,152 is a continuation-in-part of application No. 18/196,786, filed on May 12, 2023, which is a continuation-in-part of application No. 18/134,950, filed on Apr. 14, 2023, and a continuation-in-part of application No. 18/130,285, filed on Apr. 3, 2023, said application No. 18/198,152 is a continuation-in-part of application No. 18/196,936, filed on May 12, 2023, which is a continuation-in-part of application No. 18/134,950, filed on Apr. 14, 2023, and a continuation-in-part of application No. 18/130,285, filed on Apr. 3, 2023, said application No. 18/198,671 is a continuation-in-part of application No. 18/198,025, filed on May 16, 2023, which is a continuation-in-part of application No. 18/196,807, filed on May 12, 2023, and a continuation-in-part of application No. 18/196,912, filed on May 12, 2023, and a continuation-in-part of application No. 18/196,931, filed on May 12, 2023, and a continuation-in-part of application No. 18/196,765, filed on May 12, 2023, and a continuation-in-part of application No. 18/196,944, filed on May 12, 2023, and a continuation-in-part of application No. 18/196,786, filed on May 12, 2023, and a continuation-in-part of application No. 18/196,936, filed on May 12, 2023.

(60) Provisional application No. 63/344,445, filed on May 20, 2022, provisional application No. 63/400,138, filed on Aug. 23, 2022.

(51) Int. Cl.
 *G01S 13/58* (2006.01)
 *G01S 13/62* (2006.01)

(52) U.S. Cl.
 CPC ... *H04W 56/0015* (2013.01); *H04W 56/0035* (2013.01); *H04W 56/005* (2013.01)

(56) References Cited

U.S. PATENT DOCUMENTS

| | | |
|---|---|---|
| 4,399,531 A | 8/1983 | Grande et al. |
| 4,806,934 A | 2/1989 | Magoon |
| 5,835,482 A | 11/1998 | Allen |
| 5,898,902 A | 4/1999 | Tuzov |
| 6,008,758 A | 12/1999 | Campbell |
| 6,072,425 A | 6/2000 | Vopat |
| 6,115,394 A | 9/2000 | Balachandran et al. |
| 6,195,403 B1 | 2/2001 | Anderson et al. |
| 6,496,940 B1 | 12/2002 | Horst et al. |
| 6,662,229 B2 | 12/2003 | Passman et al. |
| 6,718,174 B2 | 4/2004 | Vayanos |
| 6,721,290 B1 | 4/2004 | Kondylis et al. |
| 6,744,740 B2 | 6/2004 | Chen |
| 6,845,091 B2 | 1/2005 | Ogier et al. |
| 7,023,818 B1 | 4/2006 | Elliott |
| 7,171,476 B2 | 1/2007 | Maeda et al. |
| 7,242,671 B2 | 7/2007 | Li et al. |
| 7,272,472 B1 | 9/2007 | McElreath |
| 7,299,013 B2 | 11/2007 | Rotta et al. |
| 7,343,170 B1 | 3/2008 | Feeney et al. |
| 7,417,948 B2 | 8/2008 | Sjöblom |
| 7,418,343 B1 | 8/2008 | McGraw et al. |
| 7,558,575 B2 | 7/2009 | Losh et al. |
| 7,573,835 B2 | 8/2009 | Sahinoglu et al. |
| 7,633,921 B2 | 12/2009 | Thubert et al. |
| 7,639,652 B1 | 12/2009 | Amis et al. |
| 7,679,551 B2 | 3/2010 | Petovello et al. |
| 7,698,463 B2 | 4/2010 | Ogier et al. |
| 7,719,989 B2 | 5/2010 | Yau |
| 7,729,240 B1 | 6/2010 | Crane et al. |
| 7,787,450 B1 | 8/2010 | Chan et al. |
| 7,881,229 B2 | 2/2011 | Weinstein et al. |
| 7,903,662 B2 | 3/2011 | Cohn |
| 7,983,239 B1 | 7/2011 | Weinstein et al. |
| 8,010,287 B1 | 8/2011 | Frank et al. |
| 8,036,224 B2 | 10/2011 | Axelsson et al. |
| 8,159,397 B2 | 4/2012 | Feller et al. |
| 8,159,954 B2 | 4/2012 | Larsson et al. |
| 8,217,836 B1 | 7/2012 | Anderson et al. |
| 8,218,550 B2 | 7/2012 | Axelsson et al. |
| 8,223,660 B2 | 7/2012 | Allan et al. |
| 8,223,868 B2 | 7/2012 | Lee |
| 8,341,289 B2 | 12/2012 | Hellhake et al. |
| 8,369,445 B2 | 2/2013 | Hensley |
| 8,490,175 B2 | 7/2013 | Barton et al. |
| 8,553,560 B2 | 10/2013 | Axelsson et al. |
| 8,599,956 B1 | 12/2013 | Mitchell |
| 8,614,997 B1 | 12/2013 | Herder |
| 8,630,291 B2 | 1/2014 | Shaffer et al. |
| 8,717,230 B1 | 5/2014 | Fischi et al. |
| 8,717,935 B2 | 5/2014 | Lindem, III et al. |
| 8,732,338 B2 | 5/2014 | Hutchison et al. |
| 8,798,034 B2 | 8/2014 | Aggarwal et al. |
| 8,824,444 B1 | 9/2014 | Berenberg et al. |
| 8,867,427 B2 | 10/2014 | Taori et al. |
| 8,880,001 B1 | 11/2014 | Hwang et al. |
| 8,909,471 B1 | 12/2014 | Jinkins et al. |
| 8,913,543 B2 | 12/2014 | Zainaldin |
| 8,942,197 B2 | 1/2015 | Rudnick et al. |
| 8,964,739 B1 | 2/2015 | Wisehart |
| 8,989,326 B2 | 3/2015 | An et al. |
| 9,075,126 B2 | 7/2015 | Robinson |
| 9,179,475 B2 | 11/2015 | Koleszar et al. |
| 9,246,795 B2 | 1/2016 | Madaiah et al. |
| 9,264,126 B2 | 2/2016 | Foster et al. |
| 9,294,159 B2 | 3/2016 | Duerksen |
| 9,304,198 B1 | 4/2016 | Doerry et al. |
| 9,325,513 B2 | 4/2016 | Liu et al. |
| 9,345,029 B2 | 5/2016 | Monte et al. |
| 9,355,564 B1 | 5/2016 | Tyson et al. |
| 9,430,947 B2 | 8/2016 | Richardson et al. |
| 9,435,884 B2 | 9/2016 | Inoue |
| 9,516,513 B2 | 12/2016 | Saegrov et al. |
| 9,523,761 B1 | 12/2016 | Hoffmann et al. |
| 9,544,162 B2 | 1/2017 | Vasseur et al. |
| 9,621,208 B1 | 4/2017 | Snodgrass et al. |
| 9,628,285 B2 | 4/2017 | Császár |
| 9,693,330 B1 | 6/2017 | Snodgrass et al. |
| 9,696,407 B1 | 7/2017 | Greenleaf et al. |
| 9,713,061 B2 | 7/2017 | Ruiz et al. |
| 9,766,339 B2 | 9/2017 | Robinson et al. |
| 9,858,822 B1 | 1/2018 | Gentry |
| 9,883,348 B1 | 1/2018 | Walker et al. |
| 9,979,462 B2 | 5/2018 | Watson et al. |
| 9,979,635 B2 | 5/2018 | Hellhake et al. |
| 10,097,469 B2 | 10/2018 | Hui et al. |
| 10,098,051 B2 | 10/2018 | Mosko et al. |
| 10,205,654 B2 | 2/2019 | Choi et al. |
| 10,257,655 B2 | 4/2019 | Cody |
| 10,365,376 B2 | 7/2019 | Lee et al. |
| 10,382,897 B1 | 8/2019 | Lanes et al. |
| 10,455,521 B2 | 10/2019 | Hudson et al. |
| 10,484,837 B2 | 11/2019 | Navalekar et al. |
| 10,509,130 B2 | 12/2019 | Snyder et al. |
| 10,531,500 B2 | 1/2020 | Ulinskas |
| 10,601,684 B2 | 3/2020 | Hashmi et al. |
| 10,601,713 B1 | 3/2020 | Turgeman et al. |
| 10,609,622 B2 | 3/2020 | Bader et al. |
| 10,620,296 B1 | 4/2020 | Ezal et al. |
| 10,622,713 B2 | 4/2020 | Ma |
| 10,650,688 B1 | 5/2020 | DeRoche |
| 10,719,076 B1 | 7/2020 | Gavrilets et al. |
| 10,785,672 B2 | 9/2020 | Kwan et al. |
| 10,798,053 B2 | 10/2020 | Nolan et al. |
| 10,838,070 B1 | 11/2020 | Chapman et al. |
| 10,871,575 B2 | 12/2020 | Petrovic et al. |
| 10,873,429 B1 | 12/2020 | Kwon et al. |
| 10,908,277 B1 | 2/2021 | Roggendorf et al. |
| 10,931,570 B1 | 2/2021 | Kwon et al. |
| 10,965,584 B1 | 3/2021 | Kwon et al. |
| 10,979,348 B1 | 4/2021 | Kwon et al. |
| 10,993,201 B2 | 4/2021 | Luecke |
| 10,999,778 B1 | 5/2021 | Kwon et al. |
| 11,071,039 B2 | 7/2021 | Fallon et al. |
| 11,073,622 B2 | 7/2021 | Cohen |
| 11,082,324 B2 | 8/2021 | Ramanathan et al. |
| 11,129,078 B2 | 9/2021 | Yates et al. |
| 11,284,295 B1 | 3/2022 | Kwon et al. |
| 11,290,942 B2 | 3/2022 | Kwon et al. |
| 11,411,613 B2 | 8/2022 | Jorgenson et al. |
| 11,415,664 B2 | 8/2022 | Hammes et al. |
| 11,443,638 B2 | 9/2022 | Byxbe |
| 11,500,111 B2 | 11/2022 | Frederiksen et al. |
| 11,528,675 B2 | 12/2022 | Nagaraja et al. |
| 11,536,850 B2 | 12/2022 | Sharma et al. |
| 2002/0018448 A1 | 2/2002 | Amis et al. |
| 2003/0035589 A1 | 2/2003 | Kim |
| 2003/0151513 A1 | 8/2003 | Herrmann et al. |
| 2004/0012859 A1 | 1/2004 | Minefuji |
| 2004/0028016 A1 | 2/2004 | Billhartz |
| 2004/0123228 A1 | 6/2004 | Kikuchi et al. |
| 2004/0213239 A1 | 10/2004 | Lin et al. |
| 2004/0246902 A1 | 12/2004 | Weinstein et al. |
| 2005/0025076 A1 | 2/2005 | Chaudhuri et al. |
| 2006/0010170 A1 | 1/2006 | Lashley et al. |
| 2006/0056421 A1 | 3/2006 | Zaki |
| 2007/0086541 A1 | 4/2007 | Moon et al. |
| 2007/0097880 A1 | 5/2007 | Rajsic |
| 2007/0109182 A1 | 5/2007 | Budic |
| 2007/0109979 A1 | 5/2007 | Fu et al. |
| 2007/0223497 A1 | 9/2007 | Elson et al. |
| 2007/0299950 A1 | 12/2007 | Kulkarni |
| 2008/0107034 A1 | 5/2008 | Jetcheva et al. |
| 2008/0117904 A1 | 5/2008 | Radha et al. |
| 2008/0219204 A1 | 9/2008 | Lee et al. |
| 2008/0273582 A1 | 11/2008 | Gaal et al. |
| 2008/0291945 A1 | 11/2008 | Luo |
| 2008/0310325 A1 | 12/2008 | Yang |
| 2009/0086713 A1 | 4/2009 | Luo |
| 2009/0271054 A1 | 10/2009 | Dokken |
| 2009/0290572 A1 | 11/2009 | Gonia et al. |
| 2009/0318138 A1 | 12/2009 | Zeng et al. |
| 2010/0074101 A1 | 3/2010 | Skalecki et al. |

(56) References Cited

U.S. PATENT DOCUMENTS

| | | |
|---|---|---|
| 2010/0074141 A1 | 3/2010 | Nguyen |
| 2011/0006913 A1 | 1/2011 | Chen et al. |
| 2011/0013487 A1 | 1/2011 | Zhou et al. |
| 2011/0188378 A1 | 8/2011 | Collins et al. |
| 2011/0312279 A1 | 12/2011 | Tsai et al. |
| 2012/0092208 A1 | 4/2012 | LeMire et al. |
| 2012/0098699 A1 | 4/2012 | Calmettes et al. |
| 2013/0006834 A1 | 1/2013 | Waelbroeck et al. |
| 2013/0069834 A1 | 3/2013 | Duerksen |
| 2013/0100942 A1 | 4/2013 | Rudnick et al. |
| 2013/0195017 A1 | 8/2013 | Jamadagni et al. |
| 2013/0250808 A1 | 9/2013 | Hui et al. |
| 2014/0017196 A1 | 1/2014 | Han et al. |
| 2014/0018097 A1 | 1/2014 | Goldstein |
| 2014/0029704 A1 | 1/2014 | Becker |
| 2014/0188990 A1 | 7/2014 | Fulks |
| 2014/0229519 A1 | 8/2014 | Dietrich et al. |
| 2014/0236483 A1 | 8/2014 | Beaurepaire et al. |
| 2014/0258201 A1 | 9/2014 | Finlow-Bates |
| 2014/0292568 A1 | 10/2014 | Fleming et al. |
| 2015/0010153 A1 | 1/2015 | Robertson |
| 2015/0025818 A1* | 1/2015 | Das ............... G01R 31/3181 702/58 |
| 2015/0222479 A1 | 8/2015 | Kim et al. |
| 2015/0296335 A1 | 10/2015 | Joshi et al. |
| 2015/0326689 A1 | 11/2015 | Leppänen et al. |
| 2016/0139241 A1 | 5/2016 | Holz et al. |
| 2016/0150465 A1 | 5/2016 | Jung et al. |
| 2016/0189381 A1 | 6/2016 | Rhoads |
| 2016/0373997 A1 | 12/2016 | Petersen et al. |
| 2017/0111266 A1 | 4/2017 | Ko |
| 2017/0111771 A1 | 4/2017 | Haque et al. |
| 2017/0134227 A1 | 5/2017 | Song et al. |
| 2017/0149658 A1 | 5/2017 | Rimhagen et al. |
| 2018/0013665 A1 | 1/2018 | Ko et al. |
| 2018/0098263 A1 | 4/2018 | Luo et al. |
| 2018/0146489 A1 | 5/2018 | Jin et al. |
| 2018/0234336 A1 | 8/2018 | Schumm et al. |
| 2018/0302807 A1 | 10/2018 | Chen et al. |
| 2018/0317226 A1 | 11/2018 | Sakoda |
| 2019/0098625 A1 | 3/2019 | Johnson et al. |
| 2019/0222302 A1 | 7/2019 | Lin et al. |
| 2019/0251848 A1 | 8/2019 | Sivanesan et al. |
| 2019/0317207 A1 | 10/2019 | Schroder et al. |
| 2019/0349172 A1 | 11/2019 | Zhang |
| 2020/0011968 A1 | 1/2020 | Hammes et al. |
| 2020/0052997 A1 | 2/2020 | Ramanathan et al. |
| 2020/0092949 A1 | 3/2020 | Donepudi et al. |
| 2020/0196309 A1 | 6/2020 | Amouris |
| 2020/0236607 A1 | 7/2020 | Zhu et al. |
| 2020/0350983 A1 | 11/2020 | Alasti et al. |
| 2020/0371247 A1 | 11/2020 | Marmet |
| 2020/0396708 A1 | 12/2020 | Bharadwaj et al. |
| 2021/0083917 A1 | 3/2021 | Konishi et al. |
| 2021/0153097 A1 | 5/2021 | Du et al. |
| 2021/0201044 A1 | 7/2021 | Herdade et al. |
| 2021/0359752 A1 | 11/2021 | Wang et al. |
| 2021/0385879 A1 | 12/2021 | Mahalingam et al. |
| 2021/0405176 A1 | 12/2021 | Luo |
| 2022/0015101 A1 | 1/2022 | Gallagher et al. |
| 2022/0021702 A1 | 1/2022 | Bouthemy |
| 2022/0038139 A1 | 2/2022 | Löwenmark et al. |
| 2022/0069901 A1 | 3/2022 | Tian et al. |
| 2022/0086818 A1 | 3/2022 | Nam et al. |
| 2022/0094634 A1 | 3/2022 | Kwon et al. |
| 2022/0143428 A1 | 5/2022 | Goetz et al. |
| 2022/0159741 A1 | 5/2022 | Hoang et al. |
| 2022/0173799 A1 | 6/2022 | Wigard et al. |
| 2022/0198351 A1 | 6/2022 | Beaurepaire et al. |
| 2022/0268916 A1 | 8/2022 | Nagpal |
| 2022/0286254 A1 | 9/2022 | Cha et al. |
| 2022/0317290 A1 | 10/2022 | Kostanic et al. |
| 2022/0334211 A1 | 10/2022 | Loren et al. |
| 2022/0342027 A1 | 10/2022 | Loren et al. |
| 2022/0360320 A1 | 11/2022 | Miao et al. |
| 2022/0365165 A1 | 11/2022 | Kirchner et al. |
| 2022/0368410 A1 | 11/2022 | Ma et al. |
| 2022/0413118 A1 | 12/2022 | Starr et al. |
| 2023/0033690 A1 | 2/2023 | Factor et al. |
| 2023/0057666 A1 | 2/2023 | Kwon et al. |
| 2023/0081728 A1 | 3/2023 | Kwon et al. |
| 2023/0111316 A1 | 4/2023 | Ma et al. |
| 2023/0118153 A1 | 4/2023 | Amorim et al. |
| 2023/0133633 A1 | 5/2023 | Park et al. |
| 2023/0135149 A1 | 5/2023 | Krishnamurthy et al. |

FOREIGN PATENT DOCUMENTS

| | | |
|---|---|---|
| CN | 101330448 B | 12/2010 |
| CN | 101465793 B | 2/2011 |
| CN | 202257277 U | 5/2012 |
| CN | 101686179 B | 1/2013 |
| CN | 103067286 B | 6/2016 |
| CN | 107645417 A | 1/2018 |
| CN | 110234147 A | 9/2019 |
| CN | 115085799 A | 9/2022 |
| CN | 115688598 A | 2/2023 |
| DE | 102010010935 A1 | 9/2011 |
| EP | 0908022 A2 | 4/1999 |
| EP | 1912392 A2 | 4/2008 |
| EP | 2208084 A4 | 11/2011 |
| EP | 2743726 A1 | 6/2014 |
| EP | 2466964 B1 | 12/2017 |
| EP | 3026961 B1 | 8/2020 |
| GB | 2441610 B | 12/2011 |
| GB | 2542491 A | 3/2017 |
| GB | 2568122 B | 11/2019 |
| GB | 2598610 A | 3/2022 |
| JP | 4290684 B2 | 7/2009 |
| JP | 5164157 B2 | 3/2013 |
| KR | 1020040107702 A | 12/2004 |
| KR | 100568976 B1 | 4/2006 |
| KR | 1020060078814 A | 7/2006 |
| KR | 1020160071964 A | 6/2016 |
| RU | 2718131 C1 | 3/2020 |
| WO | 2008157609 A3 | 3/2009 |
| WO | 2012062091 A1 | 5/2012 |
| WO | 2012165938 A1 | 12/2012 |
| WO | 2015114077 A1 | 8/2015 |
| WO | 2015143604 A1 | 10/2015 |
| WO | 2017101575 A1 | 6/2017 |
| WO | 2018077864 A1 | 5/2018 |
| WO | 2019045767 A1 | 3/2019 |
| WO | 2020117427 A1 | 6/2020 |
| WO | 2020165627 A1 | 8/2020 |
| WO | 2020220233 A1 | 11/2020 |
| WO | 2021251902 A1 | 12/2021 |
| WO | 2022003386 A1 | 1/2022 |
| WO | 2022202858 A1 | 9/2022 |
| WO | 2022221429 A1 | 10/2022 |
| WO | 2022232336 A1 | 11/2022 |
| WO | 2022233042 A1 | 11/2022 |
| WO | 2022233314 A1 | 11/2022 |
| WO | 2023001520 A1 | 1/2023 |
| WO | 2023030622 A1 | 3/2023 |
| WO | 2023031904 A1 | 3/2023 |
| WO | 2023047336 A1 | 3/2023 |
| WO | 2023057655 A1 | 4/2023 |
| WO | 2023067552 A1 | 4/2023 |
| WO | 2023068990 A1 | 4/2023 |
| WO | 2023081918 A1 | 5/2023 |

OTHER PUBLICATIONS

U.S. Appl. No. 17/408,156, filed Aug. 20, 2021, Tj T. Kwon.
U.S. Appl. No. 17/534,061, filed Nov. 23, 2021, William B. Sorsby.
U.S. Appl. No. 17/857,920, filed Jul. 5, 2022, Eric. J. Loren.
U.S. Appl. No. 63/344,445, filed May 2022, Loren.
U.S. Appl. No. 16/369,398, filed Mar. 29, 2019, Kwon.
U.S. Appl. No. 16/987,671, filed Aug. 2020, Kwon et al.
U.S. Appl. No. 17/233,107, filed Apr. 2021, Loren et al.
U.S. Appl. No. 17/541,703, filed Dec. 3, 2021, Kwon et al.
U.S. Appl. No. 17/857,920, filed Jul. 5, 2022, Loren et al.

(56) References Cited

OTHER PUBLICATIONS

DSSS in a Nutshell, Basics of Design, Research & Design Hub, Sep. 14, 2020.
Extended Search Report for European Application No. 21188737.7 dated Dec. 10, 2021, 8 pages.
Extended Search Report in European Application No. 21190368.7 dated Jan. 5, 2022, 10 pages.
Kwon et al., "Efficient Flooding with Passive Clustering (PC) in Ad Hoc Networks", Computer Communication Review. 32. 44-56. 10.1145/510726.510730, Aug. 11, 2003, 13 pages.
Martorella, M. et al., Ground Moving Target Imaging via SDAP-ISAR Processing: Review and New Trends. Sensors 2021, 21, 2391. https://doi.org/10.3390/s21072391.
Peng Wang, et al., "Convergence of Satellite and Terrestrial Networks: A Comprehensive Survey networks" IEEEAcess; vol. 4, Dec. 31, 2019.
Pulak K. Chowdhury, et al. "Handover Schemes in Satellite Networks: State-of-the-Art and Future Research Directions" 4th Quarter 2006, vol. 8, No. 4, Oct. 1, 2006.
Seddigh et al., "Dominating sets and neighbor elimination-based broadcasting algorithms in wireless networks", IEE Transactions in Parallel and Distributed Systems, IEEE, USA, vol. 13, No. 1, Jan. 1, 2002 (Jan. 1, 2002), pp. 14-25, XP011094090, ISSN: 1045-9219, DOI 10.1109/71.9800214.
Yi et al., "Passive Clustering in Ad Hoc Networks (PC)", URL: https://tools.ietf,org/html/drafts-yi-manet-pc-00, Nov. 14, 2001, 31 pages.

\* cited by examiner

700 ⟶

702 — PROVIDING A TRANSMITTER NODE AND A RECEIVER NODE, WHEREIN EACH NODE OF THE TRANSMITTER NODE AND THE RECEIVER NODE ARE TIME SYNCHRONIZED, WHEREIN EACH NODE OF THE TRANSMITTER NODE AND THE RECEIVER NODE ARE IN MOTION, WHEREIN EACH NODE OF THE TRANSMITTER NODE AND THE RECEIVER NODE COMPRISES A COMMUNICATIONS INTERFACE INCLUDING AT LEAST ONE ANTENNA ELEMENT, WHEREIN EACH NODE OF THE TRANSMITTER NODE AND THE RECEIVER NODE FURTHER COMPRISES A CONTROLLER OPERATIVELY COUPLED TO THE COMMUNICATIONS INTERFACE, THE CONTROLLER INCLUDING ONE OR MORE PROCESSORS, WHEREIN THE CONTROLLER HAS INFORMATION OF OWN NODE VELOCITY AND OWN NODE ORIENTATION

704 — BASED AT LEAST ON THE TIME SYNCHRONIZATION, APPLYING, BY THE TRANSMITTER NODE, DOPPLER CORRECTIONS TO THE TRANSMITTER NODE'S OWN MOTIONS RELATIVE TO A COMMON REFERENCE FRAME

706 — BASED AT LEAST ON THE TIME SYNCHRONIZATION, APPLYING, BY THE RECEIVER NODE, DOPPLER CORRECTIONS TO THE RECEIVER NODE'S OWN MOTIONS RELATIVE TO THE COMMON REFERENCE FRAME, WHEREIN THE COMMON REFERENCE FRAME IS KNOWN TO THE TRANSMITTER NODE AND THE RECEIVER NODE PRIOR TO THE TRANSMITTER NODE TRANSMITTING SIGNALS TO THE RECEIVER NODE AND PRIOR TO THE RECEIVER NODE RECEIVING THE SIGNALS FROM THE TRANSMITTER NODE

FIG.7

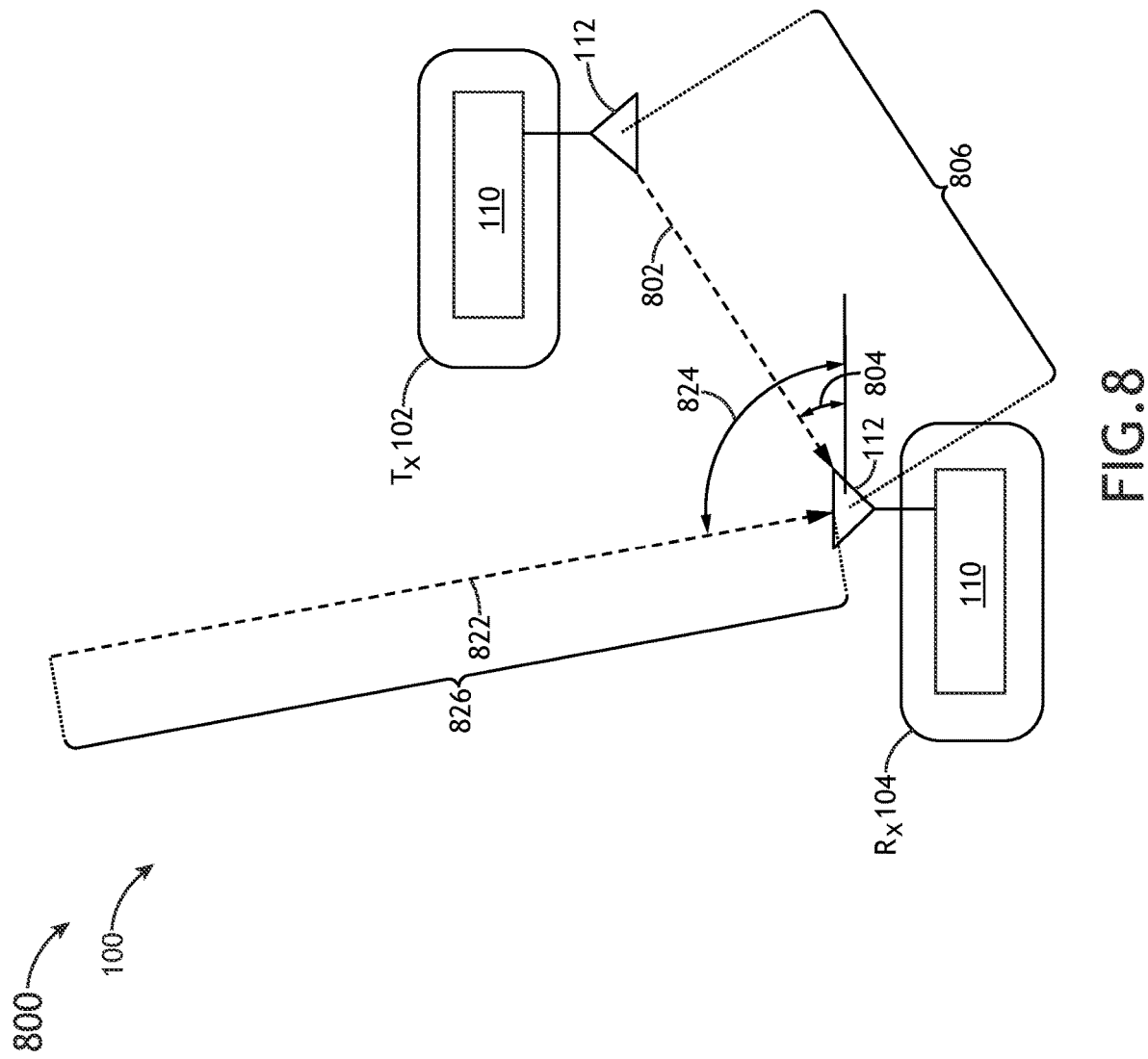

SPOOFING AND DENIAL OF SERVICE DETECTION AND PROTECTION WITH DOPPLER NULLING (SPATIAL AWARENESS)

CROSS-REFERENCE TO RELATED APPLICATIONS

The present application is related to and claims priority from the following U.S. patent applications:

(a) U.S. patent application Ser. No. 17/233,107, filed Apr. 16, 2021, which is incorporated by reference in its entirety;
(b) PCT Patent Application No. PCT/US22/24653, filed Apr. 13, 2022, which claims priority to U.S. patent application Ser. No. 17/233,107, filed Apr. 16, 2021, all of which are incorporated by reference in its entirety;
(c) U.S. patent application Ser. No. 17/408,156, filed Aug. 20, 2021, which claims priority to U.S. patent application Ser. No. 17/233,107, filed Apr. 16, 2021, all of which are incorporated by reference in its entirety;
(d) U.S. patent application Ser. No. 17/541,703, filed Dec. 3, 2021, which is incorporated by reference in its entirety, which claims priority to:
U.S. patent application Ser. No. 17/408,156, filed Aug. 20, 2021, which is incorporated by reference in its entirety; and
U.S. patent application Ser. No. 17/233,107, filed Apr. 16, 2021, all of which is incorporated by reference in its entirety;
(e) U.S. patent application Ser. No. 17/534,061, filed Nov. 23, 2021, which is incorporated by reference in its entirety;
(f) U.S. Patent Application No. 63/344,445, filed May 20, 2022, which is incorporated by reference in its entirety;
(g) U.S. patent application Ser. No. 17/857,920, filed Jul. 5, 2022, which is incorporated by reference in its entirety;
(h) U.S. Patent Application No. 63/400,138, filed Aug. 23, 2022, which is incorporated by reference in its entirety;
(i) U.S. patent application Ser. No. 17/940,898, filed Sep. 8, 2022, which is incorporated by reference in its entirety;
(j) U.S. patent application Ser. No. 17/941,907, filed Sep. 9, 2022, which is incorporated by reference in its entirety;
(k) U.S. patent application Ser. No. 17/957,881, filed Sep. 30, 2022, which is incorporated by reference in its entirety;
(l) U.S. patent application Ser. No. 17/990,491, filed Nov. 18, 2022, which is incorporated by reference in its entirety;
(m) U.S. patent application Ser. No. 18/130,285, filed Apr. 3, 2023, which is herein incorporated by reference in its entirety;
(n) U.S. patent application Ser. No. 18/134,950, filed Apr. 14, 2023, which is incorporated by reference in its entirety;
(o) U.S. patent application Ser. No. 18/196,807, filed May 12, 2023, which is incorporated by reference in its entirety;
(p) U.S. patent application Ser. No. 18/196,912, filed May 12, 2023, which is incorporated by reference in its entirety;
(q) U.S. patent application Ser. No. 18/196,931, filed May 12, 2023, which is incorporated by reference in its entirety;
(r) U.S. patent application Ser. No. 18/196,765, filed May 12, 2023, which is incorporated by reference in its entirety;
(s) U.S. patent application Ser. No. 18/196,944, filed May 12, 2023, which is incorporated by reference in its entirety;
(t) U.S. patent application Ser. No. 18/196,786, filed May 12, 2023, which is incorporated by reference in its entirety;
(u) U.S. patent application Ser. No. 18/196,936, filed May 12, 2023, which is incorporated by reference in its entirety;
(v) U.S. patent application Ser. No. 18/198,025, filed May 16, 2023, which is incorporated by reference in its entirety;
(w) U.S. patent application Ser. No. 18/198,152, filed May 16, 2023, which is incorporated by reference in its entirety; and
(x) U.S. patent application Ser. No. 18/198,671, filed May 17, 2023, which is incorporated by reference in its entirety.

BACKGROUND

The authentication of signals is a paramount factor in ensuring trusted communications. Filtering out inauthentic signals allows for overcoming noise (e.g., inadvertent multipath reflected signals) and adversarial attacks. For example, adversarial nodes may transmit spoofed signals configured to imitate other nodes and/or transmit signals configured as Denial of Service attacks. Filtering out inauthentic signals may be limited using conventional methods. For example, electronically scanned arrays may be required for angle of arrival-based authentication of GNSS signals using conventional techniques, but these techniques may be susceptible to nodes overhead generating similar angles of arrival. Note that this is only one limitation of many possible limitations of various techniques of conventional authentication systems.

Consequently, there is a need for a system and method that can address these issues.

SUMMARY

A system is disclosed in accordance with one or more illustrative embodiments of the present disclosure. In one illustrative embodiment, the system may include a receiver or transmitter node. In another illustrative embodiment, the receiver or transmitter node may include a communications interface with an antenna element and a controller. In another illustrative embodiment, the controller may include one or more processors and have information of own node velocity and own node orientation relative to a common reference frame. In another illustrative embodiment, the receiver or transmitter node may be time synchronized to apply Doppler corrections to signals, the Doppler corrections associated with the receiver or transmitter node's own motions relative to the common reference frame, the Doppler corrections applied using Doppler null steering along Null directions. In another illustrative embodiment, the receiver node is configured to determine a parameter of the signals based on Doppler null steering. In another illustrative embodiment, the receiver node is configured to determine an authenticity of the signals based on the parameter.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 7 is a flow diagram illustrating a method according to example embodiments of this disclosure.

FIG. 8 is a diagrammatic illustration of a receiver node, signals (e.g., authentic signals based on Doppler nulling), and inauthentic signals, according to example embodiments of this disclosure.

DETAILED DESCRIPTION

Figure 1:
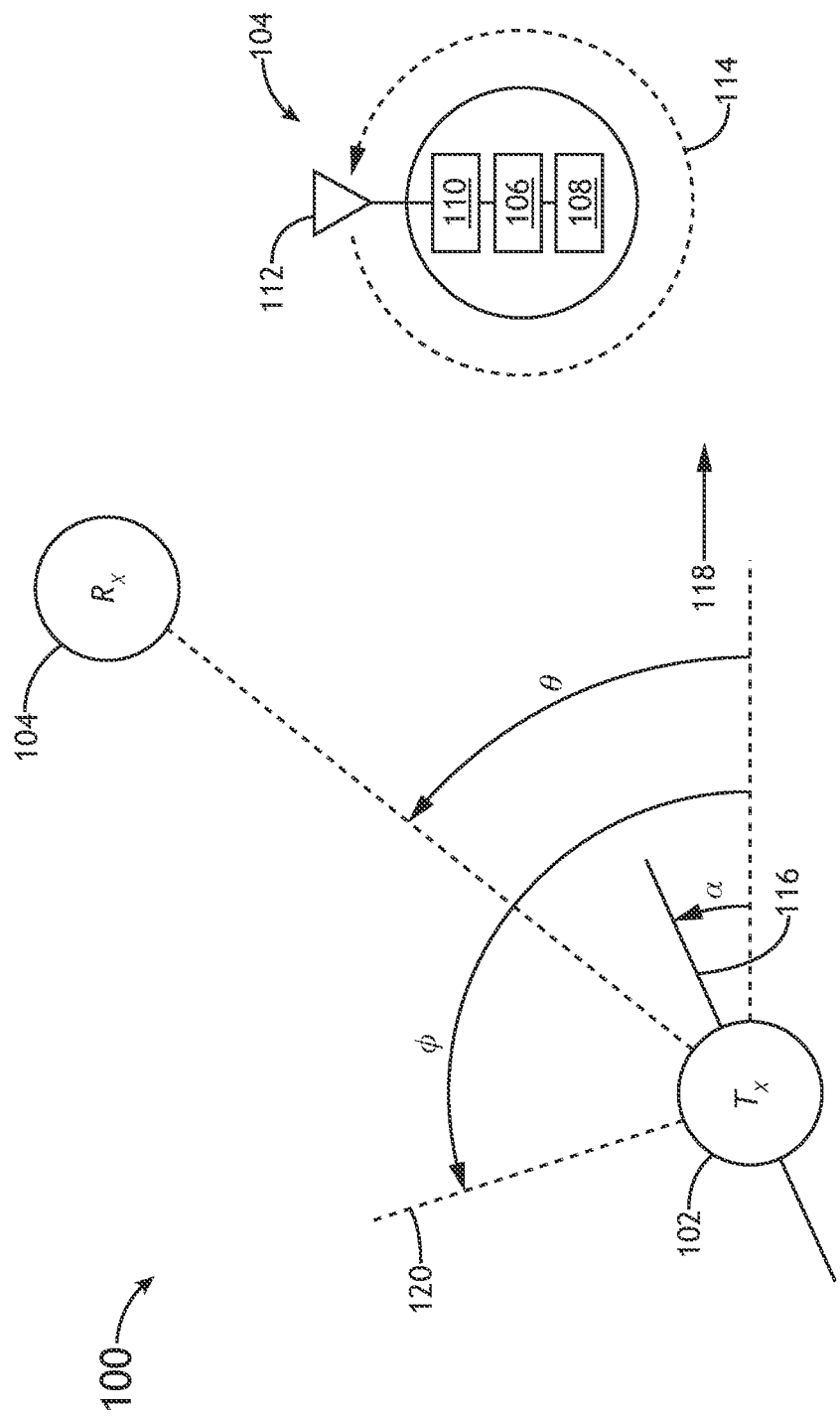
FIG. 1 is a diagrammatic illustration of two nodes in a simplified network and individual nodes thereof according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment", "in embodiments" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments herein are directed to systems and methods for determining parameters of signals based on Doppler nulling (e.g., relative positions of nodes) to authenticate signals.

As described in U.S. patent application Ser. No. 18/130, 285, filed Apr. 3, 2023, which is herein incorporated by reference in its entirety, embodiments may utilize time synchronized scanning sequences (along with directionality) to improve metrics such as signal-to-noise ratio, signal acquisition time, speed of attaining situational awareness of attributes of surrounding nodes, range, and the like. In some embodiments, a zero value or near zero value (e.g., or the like such as a zero crossing) of a calculated net frequency shift of a received signal is used to determine a bearing angle between the source (e.g., Tx node) and the receiving node using a time-of-arrival of the received signal.

It is noted that U.S. patent application Ser. No. 17/857, 920, filed Jul. 5, 2022, is at least partially reproduced by at least some (or all) of the illustrations of FIGS. 1-7 and at least some (or all) of the corresponding language for FIGS. 1-7 below. For example, at least some examples of doppler nulling methods and systems may be better understood, in a nonlimiting manner, by reference to FIGS. 1-7. Such embodiments and examples are provided for illustrative purposes and are not to be construed as necessarily limiting. For instance, in embodiments the transmitter node may be stationary rather than moving and/or vice versa.

Moreover, and stated for purposes of navigating the disclosure only and not to be construed as limiting, descriptions that may relate to other language not necessarily reproduced from U.S. patent application Ser. No. 17/857,920 include the discussion and figures after FIGS. 1-7.

Referring now to FIGS. 1-7, in some embodiments, a stationary receiver may determine a cooperative transmitter's direction and velocity vector by using a Doppler null scanning approach in two dimensions. A benefit of the approach is the spatial awareness without exchanging explicit positional information. Other benefits include discovery, synchronization, and Doppler corrections which are important for communications. Some embodiment may combine coordinated transmitter frequency shifts along with the transmitter's motion induced Doppler frequency shift to produce unique net frequency shift signal characteristics resolvable using a stationary receiver to achieve spatial awareness. Further, some embodiment may include a three-dimensional (3D) approach with the receiver and the transmitter in motion.

Some embodiments may use analysis performed in a common reference frame (e.g., a common inertial reference frame, such as the Earth, which may ignore the curvature of Earth), and it is assumed that the communications system for each of the transmitter and receiver is informed by the platform of its own velocity and orientation. The approach described herein can be used for discovery and tracking, but the discussion here focuses on discovery which is often the most challenging aspect.

The meaning of the 'Doppler Null' can be explained in part through a review of the two-dimensional (2D) case without the receiver motion, and then may be expounded on by a review of adding the receiver motion to the 2D case, and then including receiver motion in the 3D case.

The Doppler frequency shift of a communications signal is proportional to the radial velocity between transmitter and receiver, and any significant Doppler shift is typically a hindrance that should be considered by system designers. In contrast, some embodiments utilize the Doppler effect to discriminate between directions with the resolution dictated by selected design parameters. Furthermore, such embodiments use the profile of the net frequency shift as the predetermined 'Null' direction scans through the angle space. The resultant profile is sinusoidal with an amplitude that provides the transmitter's speed, a zero net frequency shift when the 'Null' direction aligns with the receiver, and a minimum indicating the direction of the transmitter's velocity. It should be noted that that the transmitter cannot correct for Doppler in all directions at one time so signal characteristics are different in each direction and are different for different transmitter velocities as well. It is exactly these characteristics that the receiver uses to determine spatial awareness. The received signal has temporal spatial characteristics that can be mapped to the transmitter's direction and velocity. This approach utilizes the concept of a 'Null' which is simply the direction where the transmitter perfectly corrects for its own Doppler shift. The same 'Nulling' protocol runs on each node and scans through all directions, such as via a scanning sequence of a protocol. Here we arbitrarily illustrate the scanning with discrete successive steps of 10 degrees but in a real system; however, it should be understood that any suitable step size of degrees may be used for Doppler null scanning.

As already mentioned, one of the contributions of some embodiments is passive spatial awareness. Traditionally, spatial information for neighbor nodes (based on a global positioning system (GPS) and/or gyros and accelerometers) can be learned via data communication. Unfortunately, spatial awareness via data communication, referred to as active spatial awareness is possible only after communication has already been established, not while discovering those neighbor nodes. Data communication is only possible after the signals for neighbor nodes have been discovered, synchronized and Doppler corrected. In contrast, in some embodiments, the passive spatial awareness described herein may be performed using only synchronization bits associated with acquisition. This process can be viewed as physical layer overhead and typically requires much lower bandwidth compared to explicit data transfers. The physical layer overheads for discovery, synchronization and Doppler correction have never been utilized for topology learning for upper layers previously.

Traditionally, network topology is harvested via a series of data packet exchanges (e.g., hello messaging and link status advertisements). The passive spatial awareness may eliminate hello messaging completely and provide a wider local topology which is beyond the coverage of hello messaging. By utilizing passive spatial awareness, highly efficient mobile networking is possible. Embodiments may improve the functioning of a network, itself.

Referring to FIG. 1, a multi-node communications network 100 is disclosed. The multi-node communications network 100 may include multiple communications nodes, e.g., a transmitter (Tx) node 102 and a receiver (Rx) node 104.

In embodiments, the multi-node communications network 100 may include any multi-node communications network known in the art. For example, the multi-node communications network 100 may include a mobile network in which the Tx and Rx nodes 102, 104 (as well as every other communications node within the multi-node communications network) is able to move freely and independently. Similarly, the Tx and Rx nodes 102, 104 may include any communications node known in the art which may be communicatively coupled. In this regard, the Tx and Rx nodes 102, 104 may include any communications node known in the art for transmitting/transceiving data packets. For example, the Tx and Rx nodes 102, 104 may include, but are not limited to, radios (such as on a vehicle or on a person), mobile phones, smart phones, tablets, smart watches, laptops, and the like. In embodiments, the Rx node 104 of the multi-node communications network 100 may each include, but are not limited to, a respective controller 106 (e.g., control processor), memory 108, communication interface 110, and antenna elements 112. (In embodiments, all attributes, capabilities, etc. of the Rx node 104 described below may similarly apply to the Tx node 102, and to any other communication node of the multi-node communication network 100.)

In embodiments, the controller 106 provides processing functionality for at least the Rx node 104 and can include any number of processors, micro-controllers, circuitry, field programmable gate array (FPGA) or other processing systems, and resident or external memory for storing data, executable code, and other information accessed or generated by the Rx node 104. The controller 106 can execute one or more software programs embodied in a non-transitory computer readable medium (e.g., memory 108) that implement techniques described herein. The controller 106 is not limited by the materials from which it is formed or the processing mechanisms employed therein and, as such, can be implemented via semiconductor(s) and/or transistors (e.g., using electronic integrated circuit (IC) components), and so forth.

In embodiments, the memory 108 can be an example of tangible, computer-readable storage medium that provides storage functionality to store various data and/or program code associated with operation of the Rx node 104 and/or controller 106, such as software programs and/or code segments, or other data to instruct the controller 106, and possibly other components of the Rx node 104, to perform the functionality described herein. Thus, the memory 108 can store data, such as a program of instructions for operating the Rx node 104, including its components (e.g., controller 106, communication interface 110, antenna elements 112, etc.), and so forth. It should be noted that while a single memory 108 is described, a wide variety of types and combinations of memory (e.g., tangible, non-transitory memory) can be employed. The memory 108 can be integral with the controller 106, can comprise stand-alone memory, or can be a combination of both. Some examples of the memory 108 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

In embodiments, the communication interface 110 can be operatively configured to communicate with components of the Rx node 104. For example, the communication interface 110 can be configured to retrieve data from the controller 106 or other devices (e.g., the Tx node 102 and/or other nodes), transmit data for storage in the memory 108, retrieve data from storage in the memory, and so forth. The communication interface 110 can also be communicatively coupled with the controller 106 to facilitate data transfer between components of the Rx node 104 and the controller 106. It should be noted that while the communication interface 110 is described as a component of the Rx node 104, one or more components of the communication interface 110 can be implemented as external components communicatively coupled to the Rx node 104 via a wired and/or wireless connection. The Rx node 104 can also include and/or connect to one or more input/output (I/O) devices. In embodiments, the communication interface 110 includes or is coupled to a transmitter, receiver, transceiver, physical connection interface, or any combination thereof.

It is contemplated herein that the communication interface 110 of the Rx node 104 may be configured to communicatively couple to additional communication interfaces 110 of additional communications nodes (e.g., the Tx node 102) of the multi-node communications network 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

In embodiments, the antenna elements 112 may include directional or omnidirectional antenna elements capable of being steered or otherwise directed (e.g., via the communications interface 110) for spatial scanning in a full 360-degree arc (114) relative to the Rx node 104 (or even less than a full 360 degree arc).

In embodiments, the Tx node 102 and Rx node 104 may one or both be moving in an arbitrary direction at an arbitrary speed, and may similarly be moving relative to each other. For example, the Tx node 102 may be moving relative to the Rx node 104 according to a velocity vector 116, at a relative velocity $V_{Tx}$ and a relative angular direction (an angle $\alpha$ relative to an arbitrary direction 118 (e.g., due east); $\theta$ may be the angular direction of the Rx node relative to due east.

In embodiments, the Tx node 102 may implement a Doppler nulling protocol. For example, the Tx node 102 may adjust its transmit frequency to counter the Doppler frequency offset such that there is no net frequency offset (e.g., "Doppler null") in a Doppler nulling direction 120 (e.g., at an angle $\phi$ relative to the arbitrary direction 118). The transmitting waveform (e.g., the communications interface 110 of the Tx node 102) may be informed by the platform (e.g., the controller 106) of its velocity vector and orientation (e.g., $\alpha$, $V_T$) and may adjust its transmitting frequency to remove the Doppler frequency shift at each Doppler nulling direction 120 and angle $\phi$.

To illustrate aspects of some embodiments, we show the 2D dependence of the net frequency shift for a stationary receiver as a function of Null direction across the horizon, as shown in a top-down view of FIG. 1, where the receiver node 104 is stationary and positioned $\theta$ from east relative to the transmitter, the transmitter node 102 is moving with a speed $|\vec{V_T}|$ and direction $\alpha$ from east and a snapshot of the scanning $\phi$ which is the 'Null' direction, exemplarily shown as 100 degrees in this picture.

The Doppler shift is a physical phenomenon due to motion and can be considered as a channel effect. In this example the transmitter node 102 is the only moving object, so it is the only source of Doppler shift. The Doppler frequency shift as seen by the receiver node 104 due to the transmitter node 102 motion is:

$$\frac{\Delta f_{DOPPLER}}{f} = \frac{|\vec{V_T}|}{c}\cos(\theta - \alpha),$$

where c is the speed of light

The other factor is the transmitter frequency adjustment term that should exactly compensate the Doppler shift when the 'Null' direction aligns with the receiver direction. It is the job of the transmitter node 102 to adjust its transmit frequency according to its own speed ($|\vec{V_T}|$), and velocity direction ($\alpha$). That transmitter frequency adjustment ($\Delta f_T$) is proportional to the velocity projection onto the 'Null' direction ($\phi$) and is:

$$\frac{\Delta f_T}{f} = -\frac{|\vec{V_T}|}{c}\cos(\varphi - \alpha)$$

The net frequency shift seen by the receiver is the sum of the two terms:

$$\frac{\Delta f_{net}}{f} = \frac{|\vec{V_T}|}{c}[\cos(\theta - \alpha) - \cos(\varphi - \alpha)]$$

It is assumed that the velocity vector and the direction changes slowly compared to the periodic measurement of $\Delta f_{net}$. Under those conditions, the unknown parameters (from the perspective of the receiver node 104) of $\alpha$, $|\vec{V_T}|$, and $\theta$ are constants.

Furthermore, it is assumed that the receiver node 104 has an implementation that resolves the frequency of the incoming signal, as would be understood to one of ordinary skill in the art.

Figure 2A:
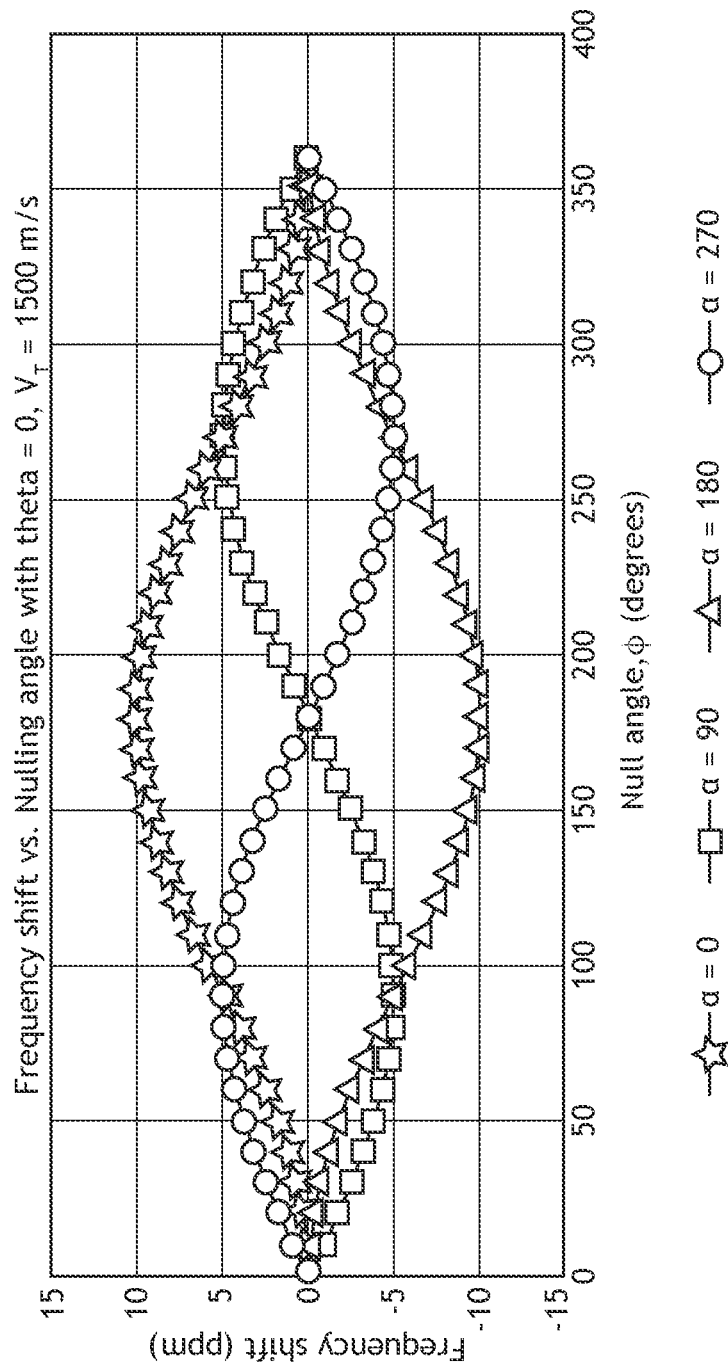
FIG. 2A is a graphical representation of frequency shift profiles within the network of FIG. 1.
Figure 2B:
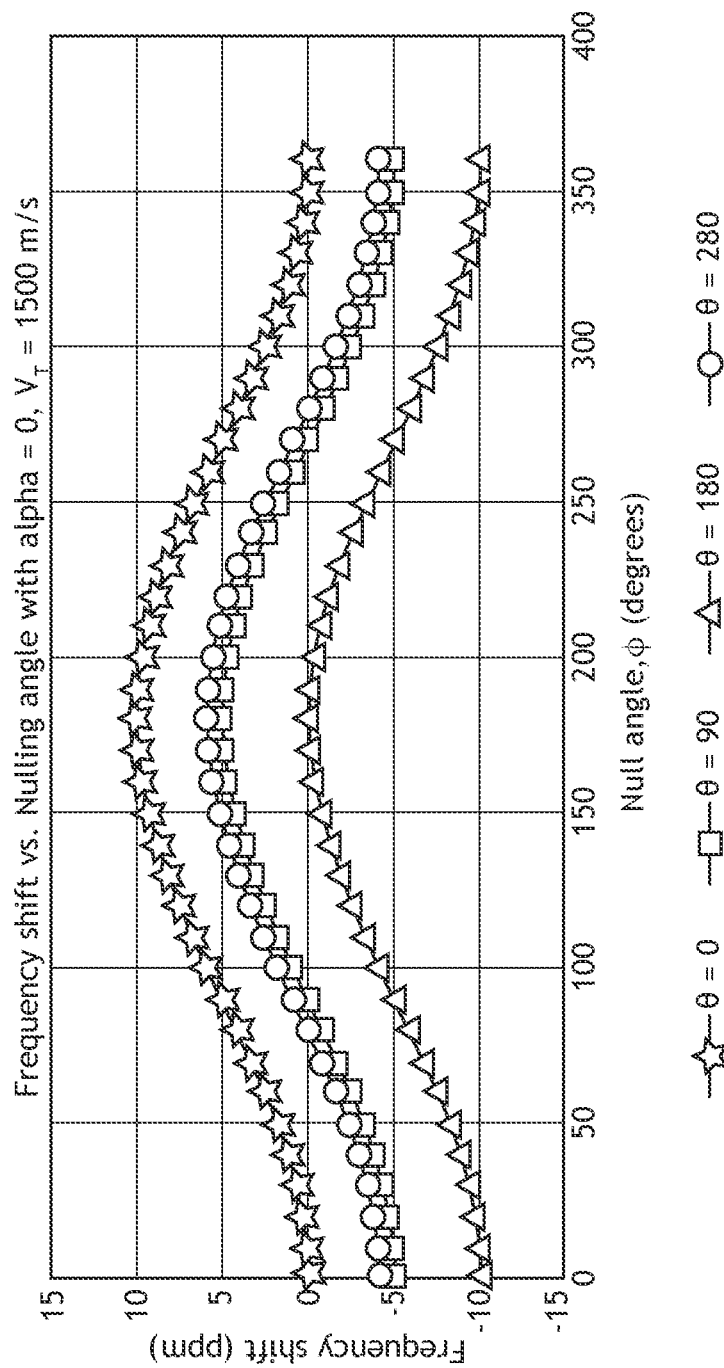
FIG. 2B is a graphical representation of frequency shift profiles within the network of FIG. 1.

FIG. 2A shows the resulting net frequency shift as a function of the 'Null' direction for scenarios where a stationary receiver is East of the transmitter (theta=0), and with a transmitter speed of 1500 meters per second (m/s). FIG. 2B shows the results for a stationary receiver and for several directions with an Eastern transmitter node velocity direction (alpha=0). The frequency shifts are in units of parts per million (ppm). As shown in FIGS. 2A and 2B, the amplitude is consistent with the transmitter node's 102 speed of 5 ppm [$|\vec{V_T}|/c*(1\times10^6)$] regardless of the velocity direction or position, the net frequency shift is zero when the 'Null' angle is in the receiver direction (when $\phi=8$), and the minimum occurs when the 'Null' is aligned with the transmitter node's 102 velocity direction (when $\phi=\alpha$).

From the profile, the receiver node 104 can therefore determine the transmitter node's 102 speed, the transmitter node's 102 heading, and the direction of the transmitter node 102 is known to at most, one of two locations (since some profiles have two zero crossings). It should be noted that the two curves cross the y axis twice (0 & 180 degrees in FIGS. 2A, and ±90 degrees in FIG. 2B) so there is initially an instance of ambiguity in position direction. In this case the receiver node 104 knows the transmitter node 102 is either East or West of the receiver node 104.

Figure 3:
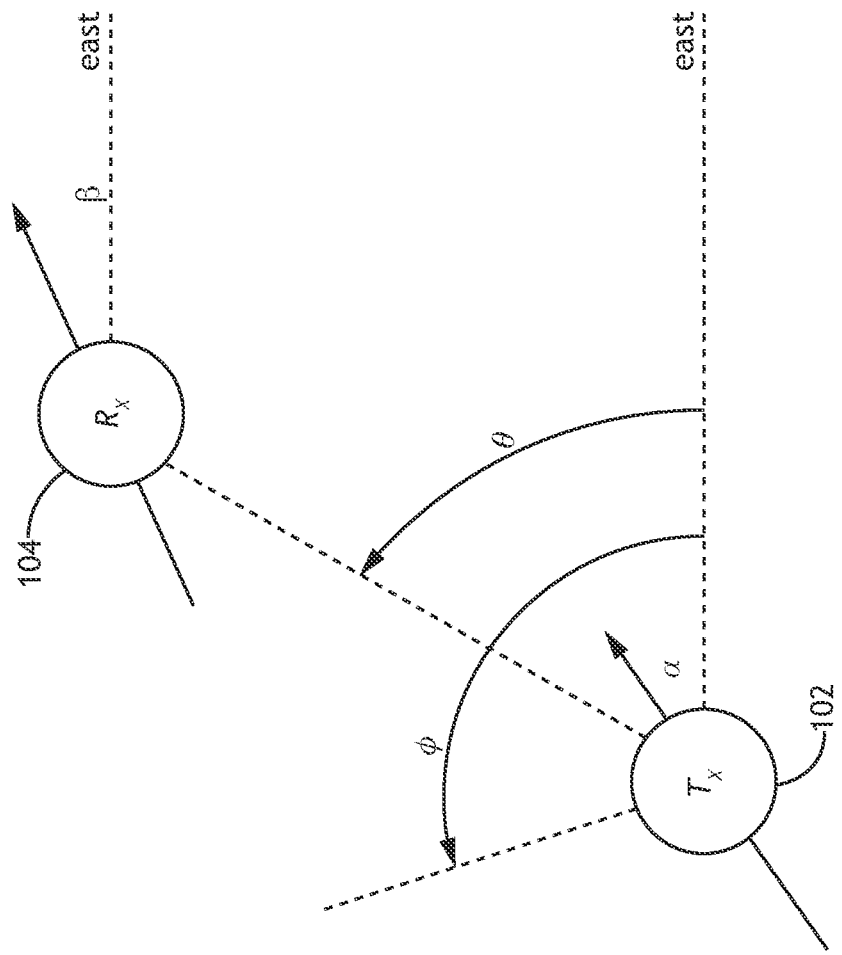
FIG. 3 is a diagrammatic illustration of a transmitter node and a receiver node according to example embodiments of this disclosure.

Referring to FIG. 3, a multi-node communications network 100 is disclosed. The multi-node communications network 100 may include multiple communications nodes, e.g., a transmitter (Tx) node 102 and a receiver (Rx) node 104. As shown in FIG. 3 both of the transmitter node 102 and the receiver node 104 are in motion in two dimensions.

The simultaneous movement scenario is depicted in FIG. 3 where the receiver node 104 is also moving in a generic velocity characterized by a speed $|\vec{V_T}|$ and the direction, $\beta$. The protocol for the moving receiver node 104 incorporates a frequency adjustment on the receiver node's 104 side to compensate for the receiver node's 104 motion as well. The equations have two additional terms. One is a Doppler term for the motion of the receiver and the second is frequency compensation by the receiver.

Again, the Doppler shift is a physical phenomenon due to motion and can be considered as a channel effect, but in this case both the transmitter node 102 and the receiver node 104 are moving so there are two Doppler shift terms. The true Doppler shift as seen by the receiver due to the relative radial velocity is:

$$\frac{\Delta f_{DOPPLER}}{f} = \frac{|\vec{V_T}|}{c}\cos(\theta-\alpha) - \frac{|\vec{V_R}|}{c}\cos(\theta-\beta)$$

The other factors are the transmitter node 102 and receiver node 104 frequency adjustment terms that exactly compensates the Doppler shift when the 'Null' direction aligns with the receiver direction. It is the job of the transmitter node 102 to adjust the transmitter node's 102 transmit frequency according to its own speed ($|\vec{V_T}|$), and velocity direction ($\alpha$). That transmitter node frequency adjustment is proportional to the velocity projection onto the 'Null' direction ($\phi$) and is the first term in the equation below.

It is the job of the receiver node 104 to adjust the receiver node frequency according to the receiver node's 104 own speed ($|\vec{V_R}|$), and velocity direction ($\beta$). That receiver node frequency adjustment is proportional to the velocity projection onto the 'Null' direction ($\phi$) and is the second term in the equation below. The receiver node frequency adjustment can be done to the receive signal prior to the frequency resolving algorithm or could be done within the algorithm.

$$\frac{\Delta f_{T\&R}}{f} = -\frac{|\vec{V_T}|}{c}\cos(\varphi-\alpha) + \frac{|\vec{V_R}|}{c}\cos(\varphi-\beta)$$

The net frequency shift seen by the receiver is the sum of all terms:

$$\frac{\Delta f_{net}}{f} = \frac{|\vec{V_T}|}{c}[\cos(\theta-\alpha)-\cos(\varphi-\alpha)] - \frac{|\vec{V_R}|}{c}[\cos(\theta-\beta)-\cos(\varphi-\beta)]$$

Again, it is assumed that the receiver node 104 has an implementation that resolves the frequency of the incoming signal, as would be understood in the art.

Also, it is assumed that the velocity vector and direction changes slowly compared to the periodic measurement of $\Delta f_{net}$. Again, under such conditions, the unknown parameters (from the perspective of the receiver node 104) $\alpha$, $|\vec{V_T}|$, and $\theta$ are constants. When the velocity vector or direction change faster, then this change could be tracked, for example if the change is due to slow changes in acceleration.

Figure 4A:
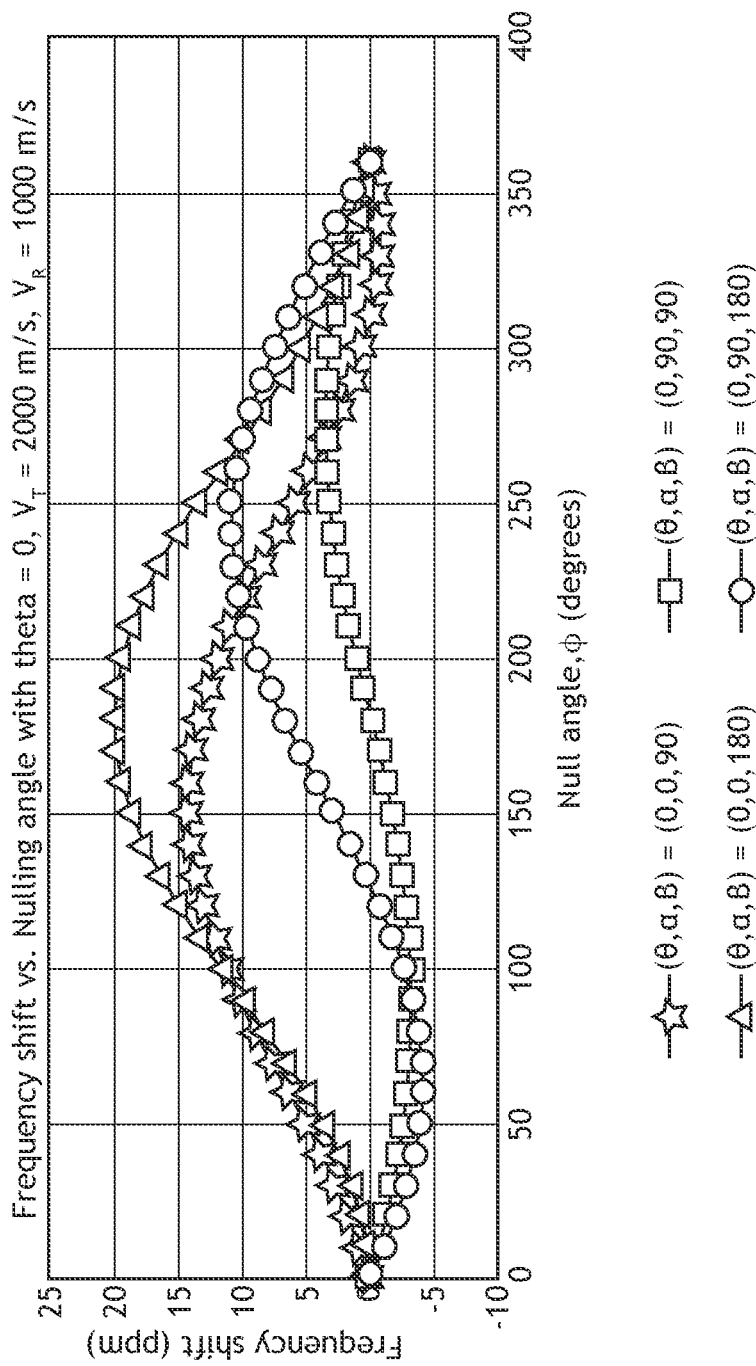
FIG. 4A is a graphical representation of frequency shift profiles within the network of FIG. 3.
Figure 4B:
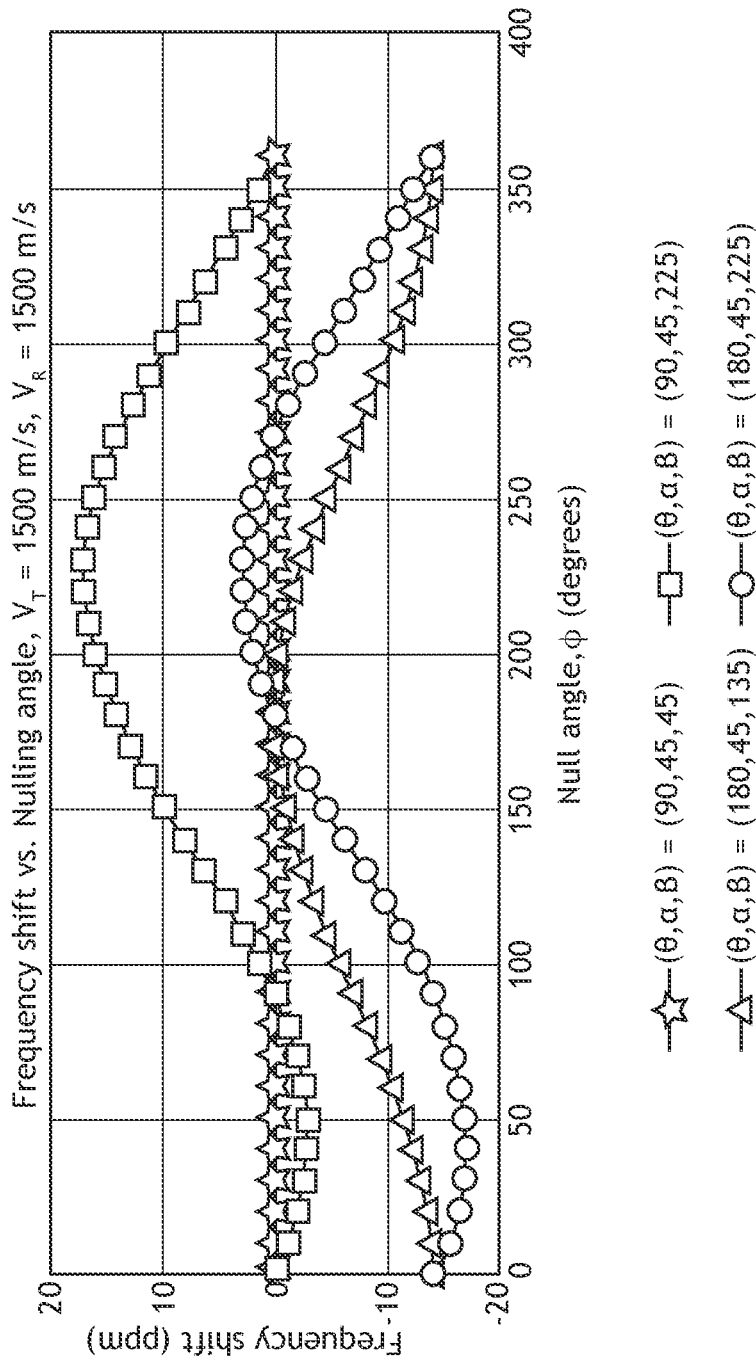
FIG. 4B is a graphical representation of frequency shift profiles within the network of FIG. 3.

The net frequency shift for the two-dimensional (2D) moving receiver node 104 approach is shown in FIGS. 4A and 4B for several scenario cases of receiver node location, $\theta$, and transmitter node and receiver node speeds ($|\vec{V_T}|$ & $|\vec{V_R}|$), as well as transmitter node and receiver node velocity direction ($\alpha$ and $\beta$). FIG. 4A has different speeds for the transmitter node 102 and receiver node 104 as well as the receiver node location of $\theta=0$. FIG. 4B has the same speed for the transmitter node and receiver node. Similarly, there are three concepts to notice here:

The amplitude is consistent with the relative velocity between transmitter node 102 and receiver node 104 [|($|\vec{V_T}|$ cos ($\alpha$)–$|\vec{V_R}|$ cos ($\beta$))|/c*(1e6)].

The net frequency shift is zero when the 'Null' angle is in the receiver direction (when $\phi=\theta$).

The minimum occurs when the 'Null' is aligned with the relative velocity direction (when $\phi$=angle($|\vec{V_T}|$ cos ($\alpha$)–$|\vec{V_R}|$ cos ($\beta$))).

Again, there is an initial dual point ambiguity with the position, $\theta$, but the transmitter node's 102 speed and velocity vector is known.

Figure 5:
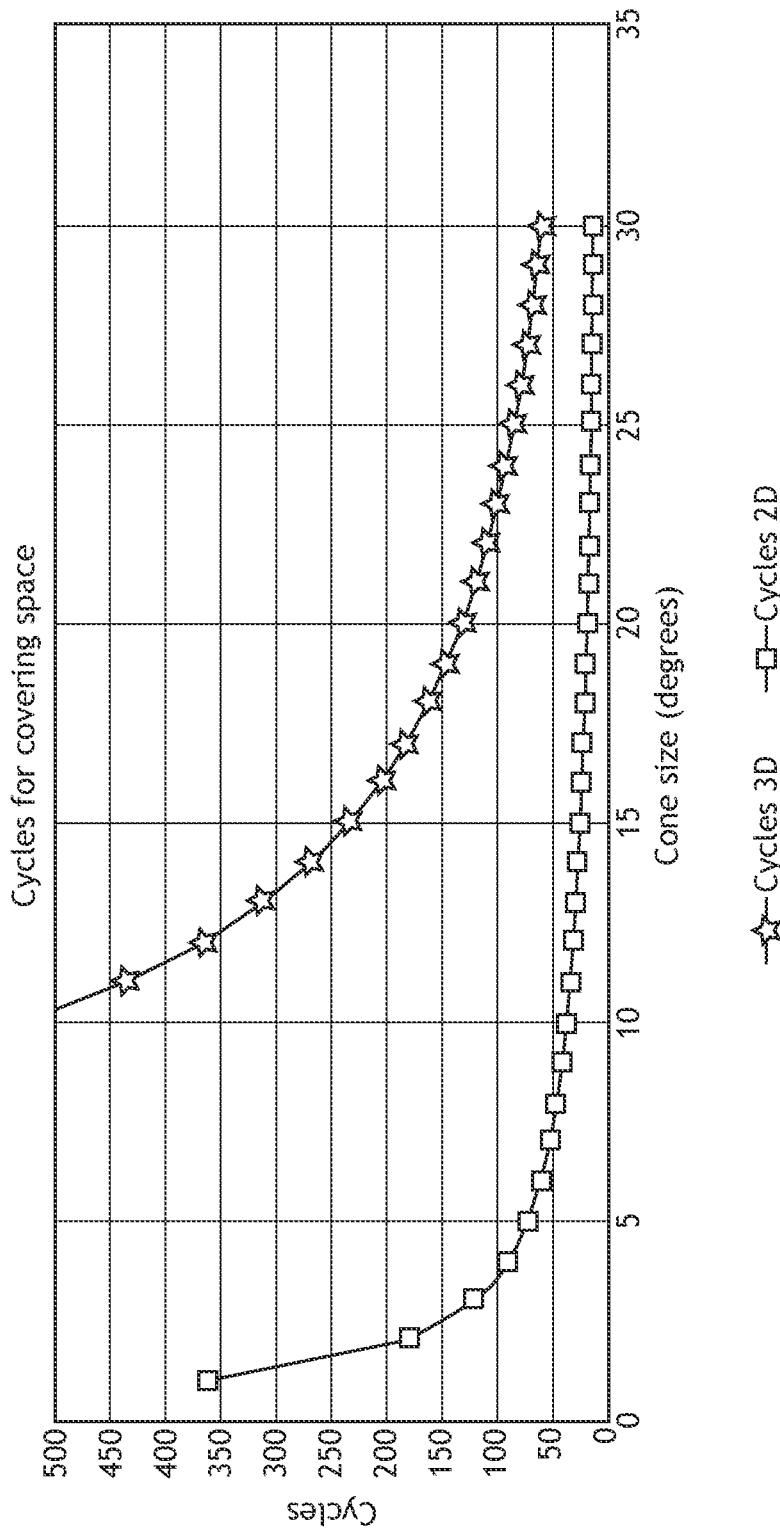
FIG. 5 is a graph of sets for covering space.

Referring now to FIG. 5, while the 2D picture is easier to visualize, the same principles apply to the 3D case. FIG. 5 shows a number of direction sets needed to span 3D and 2D space with different cone sizes (cone sizes are full width). Before diving into the equations, it's worth commenting on the size of the space when including another dimension. For example, when a 'Null' step size of 10 degrees was used in the previous examples, it took 36 sets to span the 360 degrees in 2D. Thus, if an exemplary detection angle of 10 degrees is used (e.g., a directional antenna with 10-degree cone) it would take 36 sets to cover the 2D space. The 3D fractional coverage can be computed by calculating the coverage of a cone compared to the full 4 pi steradians. The fraction is equal to the integral $$FractionCoverage3D = \frac{\int_0^{ConeSize/2} r^2\sin(\theta')d\theta'd\varphi}{4\pi r^2} = \frac{1-\cos(ConeSize/2)}{2}$$

$$FractionCoverage2D = 2\pi/ConeSize$$

The number of sets to span the space is shown in FIG. 5 for both the 2D and 3D cases which correlates with discovery time. Except for narrow cone sizes, the number of sets is not drastically greater for the 3D case (e.g., approximately 15 times at 10 degrees, 7 time at 20 degrees, and around 5 times at 30 degrees). Unless systems are limited to very narrow cone sizes, the discovery time for 3D searches is not overwhelming compared to a 2D search.

Figure 6:
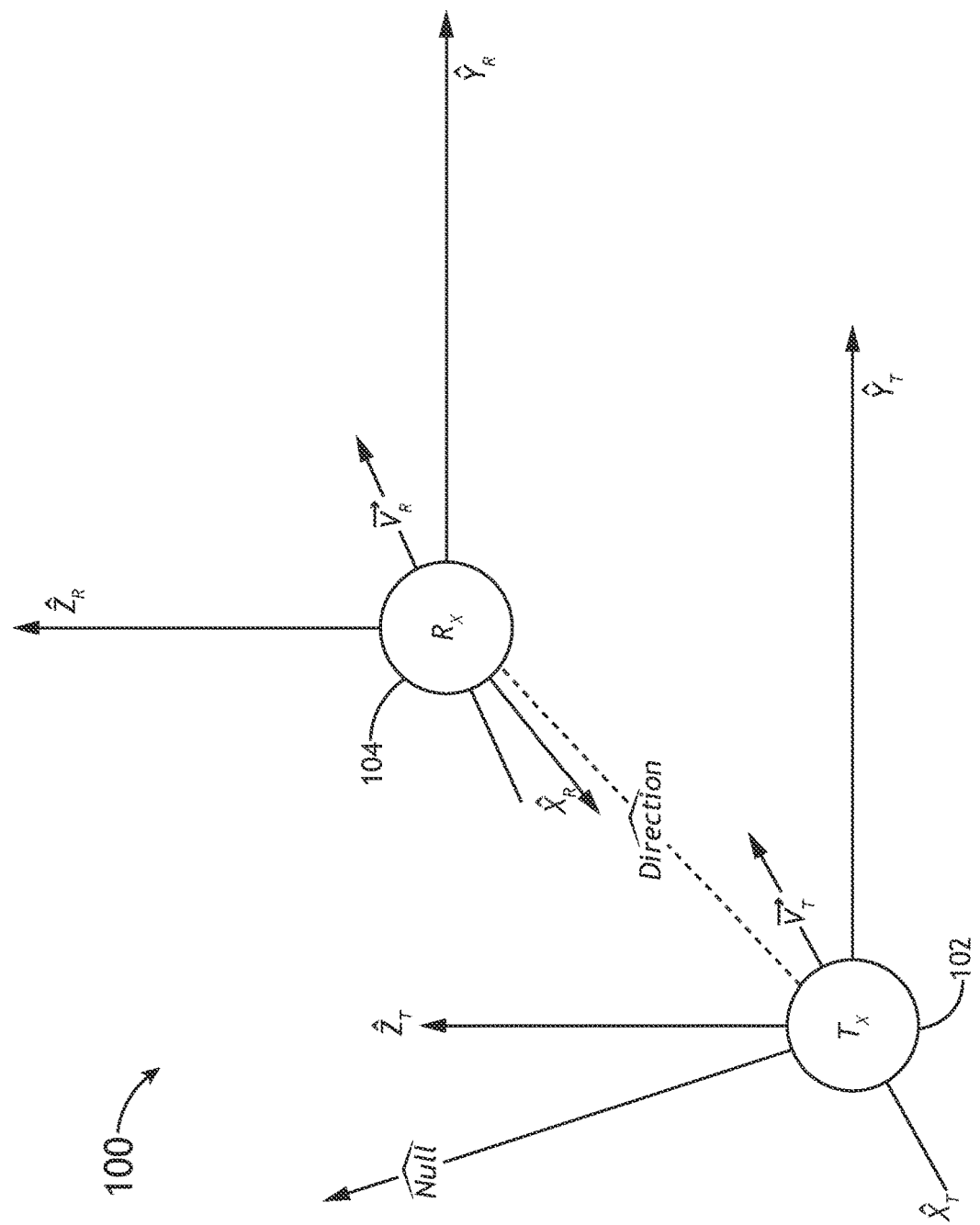
FIG. 6 is a diagrammatic illustration of a transmitter node and a receiver node according to example embodiments of this disclosure.

Referring now to FIG. 6, a multi-node communications network 100 is disclosed. The multi-node communications network 100 may include multiple communications nodes, e.g., a transmitter (Tx) node 102 and a receiver (Rx) node 104. As shown in FIG. 6 both of the transmitter node 102 and the receiver node 104 are in motion in three dimensions.

The 3D approach to Doppler nulling follows the 2D approach but it is illustrated here with angles and computed vectorially for simplicity.

In three dimensions, it is convenient to express the equations in vector form which is valid for 2 or 3 dimensions. FIG. 6 shows the geometry in 3 dimensions where $\widehat{Direction}$ is the unit vector pointing to the receiver from the transmitter, and $\widehat{Null}$ is the unit vector pointing in the 'Null' direction defined by the protocol.

The true Doppler shift as seen by the receiver node 104 due to the relative radial velocity which is the projection onto the $\widehat{Direction}$ vector:

$$\frac{\Delta f_{DOPPLER}}{f} = \frac{1}{c}\vec{V_T}\cdot\widehat{Direction} - \frac{1}{c}\vec{V_R}\cdot\widehat{Direction}$$

The nulling protocol adjusts the transmit node frequency and receiver node frequency due to their velocity projections onto the $\widehat{Null}$ direction $$\frac{\Delta f_T}{f} = -\frac{1}{c}\vec{V_T}\cdot\widehat{Null} + \frac{1}{c}\vec{V_R}\cdot\widehat{Null}$$

The net frequency shift seen by the receiver node 104 is the sum of all terms:

$$\frac{\Delta f_{net}}{f} = \frac{1}{c}\vec{V_T}\cdot\widehat{Direction} - \frac{1}{c}\vec{V_R}\cdot\widehat{Direction} - \frac{1}{c}\vec{V_T}\cdot\widehat{Null} + \frac{1}{c}\vec{V_R}\cdot\widehat{Null}$$

The net frequency shift for the 3D moving receiver node 104 approach is not easy to show pictorially but can be inspected with mathematical equations to arrive at useful conclusions. The first two terms are the Doppler correction (DC) offset and the last two terms are the null dependent terms. Since the $\widehat{Null}$ is the independent variable, the maximum occurs when $(\vec{V_R}-\vec{V_T})$ and $\widehat{Null}$ are parallel and is a minimum when they are antiparallel. Furthermore, the relative speed is determined by the amplitude, $$Amplitude = \frac{1}{c}|\vec{V_R}-\vec{V_T}|$$

Lastly, the net frequency is zero when the $\widehat{Null}$ is parallel (i.e., parallel in same direction, as opposed to anti-parallel) to $\widehat{Direction}$.

$$\frac{\Delta f_{net}}{f} = 0 \text{ when,}$$

$$\frac{1}{c}\vec{V_T}\cdot\widehat{Direction} - \frac{1}{c}\vec{V_R}\cdot\widehat{Direction} = \frac{1}{c}\vec{V_T}\cdot\widehat{Null} - \frac{1}{c}\vec{V_R}\cdot\widehat{Null} \text{ or,}$$

$$(\vec{V_T}-\vec{V_R})\cdot\widehat{Direction} = (\vec{V_T}-\vec{V_R})\cdot\widehat{Null}$$

For the 3D case:

The amplitude is consistent with the relative velocity between transmitter node 102 and receiver node 104 [| $\vec{V_R}-\vec{V_T}$|/v].

The net frequency shift is zero when the 'Null' angle is in the receiver node direction, $(\vec{V_T}-\vec{V_R})\cdot\widehat{Direction} = (\vec{V_T}-\vec{V_R})\cdot\widehat{Null}$).

The minimum occurs when the 'Null' is aligned with the relative velocity direction.

Referring still to FIG. 6, in some embodiments, the system (e.g., the multi-node communications network 100) may include a transmitter node 102 and a receiver node 104. Each node of the transmitter node 102 and the receiver node 104 may include a communications interface 110 including at least one antenna element 112 and a controller operatively coupled to the communications interface, the controller 106 including one or more processors, wherein the controller 106 has information of own node velocity and own node orientation. The transmitter node 102 and the receiver node 104 may be in motion (e.g., in two dimensions or in three dimensions). The transmitter node 102 and the receiver node 104 may be time synchronized to apply Doppler corrections associated with said node's own motions relative to a common reference frame (e.g., a common inertial reference frame (e.g., a common inertial reference frame in motion or a stationary common inertial reference frame)). The common reference frame may be known to the transmitter node 102 and the receiver node 104 prior to the transmitter node 102 transmitting signals to the receiver node 104 and prior to the receiver node 104 receiving the signals from the transmitter node 102. In some embodiments, the system is a mobile network comprising the transmitter node 102 and the receiver node 104.

In some embodiments, the applying of the Doppler corrections associated with the receiver node's own motions relative to the common reference frame is based on a common reference frequency. For example, a common reference frequency may be adjusted by a node's own motions to cancel out those motions in reference to the null angle. This common reference frequency may be known by each node prior to transmission and/or reception of the signals. In some embodiments, calculating the net frequency change seen by the receiver node 104 is based on the common reference frequency. For example, the net frequency change may be a difference between a measured frequency of the signals and the common reference frequency.

For purposes of discussing the receiver node 104, a "source" generally refers to a source of a received signal, multiple sources of multiple signals, a single source of multiple signals, and/or the like. For example, a source may be a transmitter node 102 configured to apply Doppler corrections as disclosed herein and in applications from which priority is claimed and/or incorporated by reference. In this regard, a receiver node 104 may determine one or more attributes of the source (e.g., bearing between the receiver node 104 and the source, bearing of the velocity of the source, amplitude/speed of the velocity, range, and the like). In some embodiments, the receiver node 104 and the source (e.g., transmitter node 102) are configured to use a same, compatible, and/or similar Doppler correction, protocol, common reference frame, common reference frequency, time synchronization, and/or the like such that the receiver node 104 may determine various attributes of the source. Note, in some embodiments, that one or more of these may be known ahead of time, be determined thereafter, included as fixed variable values as part of the protocol, and/or determined dynamically (in real time) as part of the protocol. For example, the protocol may determine that certain common reference frames should be used in certain environments, such as using GPS coordinates on land and a naval ship beacon transmitter common reference frame location (which may be mobile) over certain areas of ocean, which may dynamically change in real time as a location of a node changes.

In some embodiments, the transmitter node 102 and the receiver node 104 are time synchronized via synchronization bits associated with acquisition. For example, the synchronization bits may operate as physical layer overhead.

In some embodiments, the transmitter node 102 is configured to adjust a transmit frequency according to an own speed and an own velocity direction of the transmitter node 102 so as to perform a transmitter-side Doppler correction. In some embodiments, the receiver node 104 is configured to adjust a receiver frequency of the receiver node 104 according to an own speed and an own velocity direction of the receiver node 104 so as to perform a receiver-side Doppler correction. In some embodiments, an amount of adjustment of the adjusted transmit frequency is proportional to a transmitter node 102 velocity projection onto a Doppler null direction, wherein an amount of adjustment of the adjusted receiver frequency is proportional to a receiver node 104 velocity projection onto the Doppler null direction. In some embodiments, the receiver node 102 is configured to determine a relative speed between the transmitter node 102 and the receiver node 104. In some embodiments, the receiver node 104 is configured to determine a direction that the transmitter node 102 is in motion and a velocity vector of the transmitter node 102. In some embodiments, a maximum net frequency shift for a Doppler correction by the receiver node 104 occurs when a resultant vector is parallel to the Doppler null direction, wherein the resultant vector is equal to a velocity vector of the receiver node 104 minus the velocity vector of the transmitter node 102. In some embodiments, a minimum net frequency shift for a Doppler correction by the receiver node 104 occurs when a resultant vector is antiparallel to the Doppler null direction, wherein the resultant vector is equal to a velocity vector of the receiver node 104 minus the velocity vector of the transmitter node 102. In some embodiments, a net frequency shift for a Doppler correction by the receiver node 104 is zero when a vector pointing to the receiver node from the transmitter node 102 is parallel to the Doppler null direction.

Referring now to FIG. 7, an exemplary embodiment of a method 700 according to the inventive concepts disclosed herein may include one or more of the following steps. Additionally, for example, some embodiments may include performing one or more instances of the method 700 iteratively, concurrently, and/or sequentially. Additionally, for example, at least some of the steps of the method 700 may be performed in parallel and/or concurrently. Additionally, in some embodiments, at least some of the steps of the method 700 may be performed non-sequentially.

A step 702 may include providing a transmitter node and a receiver node, wherein each node of the transmitter node and the receiver node are time synchronized, wherein each node of the transmitter node and the receiver node are in motion, wherein each node of the transmitter node and the receiver node comprises a communications interface including at least one antenna element, wherein each node of the transmitter node and the receiver node further comprises a controller operatively coupled to the communications interface, the controller including one or more processors, wherein the controller has information of own node velocity and own node orientation.

A step 704 may include based at least on the time synchronization, applying, by the transmitter node, Doppler corrections to the transmitter node's own motions relative to a common reference frame.

A step 706 may include based at least on the time synchronization, applying, by the receiver node, Doppler corrections to the receiver node's own motions relative to the common reference frame, wherein the common reference frame is known to the transmitter node and the receiver node prior to the transmitter node transmitting signals to the receiver node and prior to the receiver node receiving the signals from the transmitter node.

Further, the method 700 may include any of the operations disclosed throughout.

The null scanning/steering technique discussed herein illustrates a system and a method for spatial awareness from resolving the temporal spatial characteristics of the transmitter node's 102 radiation. This approach informs the receiver node 104 of the relative speed between the transmitter node 102 and receiver node 104 as well as the transmitter node direction and transmitter node velocity vector. This approach includes scanning through all directions and has a high sensitivity (e.g., low net frequency shift) when the null direction is aligned with the transmitter node direction. This approach can be implemented on a highly sensitive acquisition frame which is typically much more sensitive than explicit data transfers which allow for the ultra-sensitive spatial awareness with relatively low power.

This sentence may mark an end to the (at least partially) reproduced language from U.S. patent application Ser. No. 17/857,920 corresponding to the (at least partially) reproduced FIGS. 1-7. However, note that this paragraph is nonlimiting, and changes may have been made and language added or removed, and not all the language above or corresponding figures above are necessarily reproduced from U.S. patent application Ser. No. 17/857,920.

Broadly speaking, embodiments herein are directed to systems and methods for determining parameters (e.g., time of arrival, frequency, and the like) of signals based on Doppler nulling and using such parameters to authenticate the signals.

Embodiments of the present disclosure may extend doppler nulling for use in signal authentication. For example, Doppler nulling-based techniques such as those disclosed herein may be used to track signals consistent with a platform (e.g., node) moving in space and time. Then, once an explicit data transfer link is established with the node based on the tracked signals, the arrival time and/or frequency offset of (future) signals may be used to determine whether such signals are authentic or inauthentic (e.g., noise and/or adversarial signals coming from a different undesired node). In this way, it is contemplated that Doppler nulling signals may allow for low susceptibility to spoofing and/or Denial of Service attacks.

In some embodiments, DNS or any other concept disclosed herein may be utilized for spoofing detection, to augment spoofing detection, and/or in lieu of other spoofing detection techniques. For example, system 100 may be configured for spectrum analysis (SA) and/or authenticating position, navigation, and timing (PNT) information.

Doppler null scanning (DNS) (i.e., Doppler null steering) may be used to as a link acquisition framework that characterizes each neighbor link's parameters. Two important parameters are the arrival time and frequency offset. Time of arrival is a combination of propagation time and clock time differences and may assume knowledge of neighbor signal transmit times. Frequency offset is a combination of Doppler shift and clock frequency errors.

In embodiments, the DNS link acquisition framework discovers and tracks DNS signals that have spatial-temporal characteristics consistent with a platform moving in space and time. Reflected signals (e.g., multipath or repeaters) in general do not have consistent characteristics and the inconsistencies can be measured to indicate inauthentic path (e.g., spoofing, multipath). In embodiments, once DNS establishes a link, explicit data transfers can utilize the arrival time and frequency offset information and only process signals that match those characteristics resulting in low susceptibility to spoofing and low susceptibility to Denial of Service attacks.

Embodiments may be used in many commercial and civilian applications such as, but not necessarily limited to, filtering out inauthentic undesired noise (e.g., multi-path reflected signals, background RF noise), and/or filtering out adversarial nodes (e.g., WiFi spoofing configured to intercept and/or inject adversarial explicit data packets to and from nodes). Applications may also include military applications such as spoofing and Denial of Service attacks on military communications.

Examples of doppler nulling methods include, but are not limited to, methods and other descriptions (e.g., at least some theory and mathematical basis) are disclosed in U.S. patent application Ser. No. 17/233,107, filed Apr. 16, 2021, which is hereby incorporated by reference in its entirety; U.S. patent application Ser. No. 17/534,061, filed Nov. 23, 2021, which is hereby incorporated by reference in its entirety; and U.S. patent application Ser. No. 17/857,920, filed Jul. 5, 2022, which is hereby incorporated by reference in its entirety. In embodiments, doppler nulling methods allow for benefits such as, but not limited to, relatively quickly and/or efficiently detecting transmitter nodes and determining transmitter node attributes (e.g., transmitter node speed, transmitter node bearing, relative bearing of transmitter node relative to receiver node, relative distance of transmitter node relative to receiver node, and the like).

FIG. 8 is a diagrammatic illustration 800 of a system 100 with nodes 102, 104 configured for authenticating signals 802, according to example embodiments of this disclosure. As shown, a receiver node 104 may receive both signals 802 (e.g., authentic signals based on Doppler nulling), and non-authentic signals 822 (e.g., a signal configured to appear as an authentic signal via spoofing). The nodes 102, 104 include communication interfaces 110 and antenna elements 112.

Figure 9:
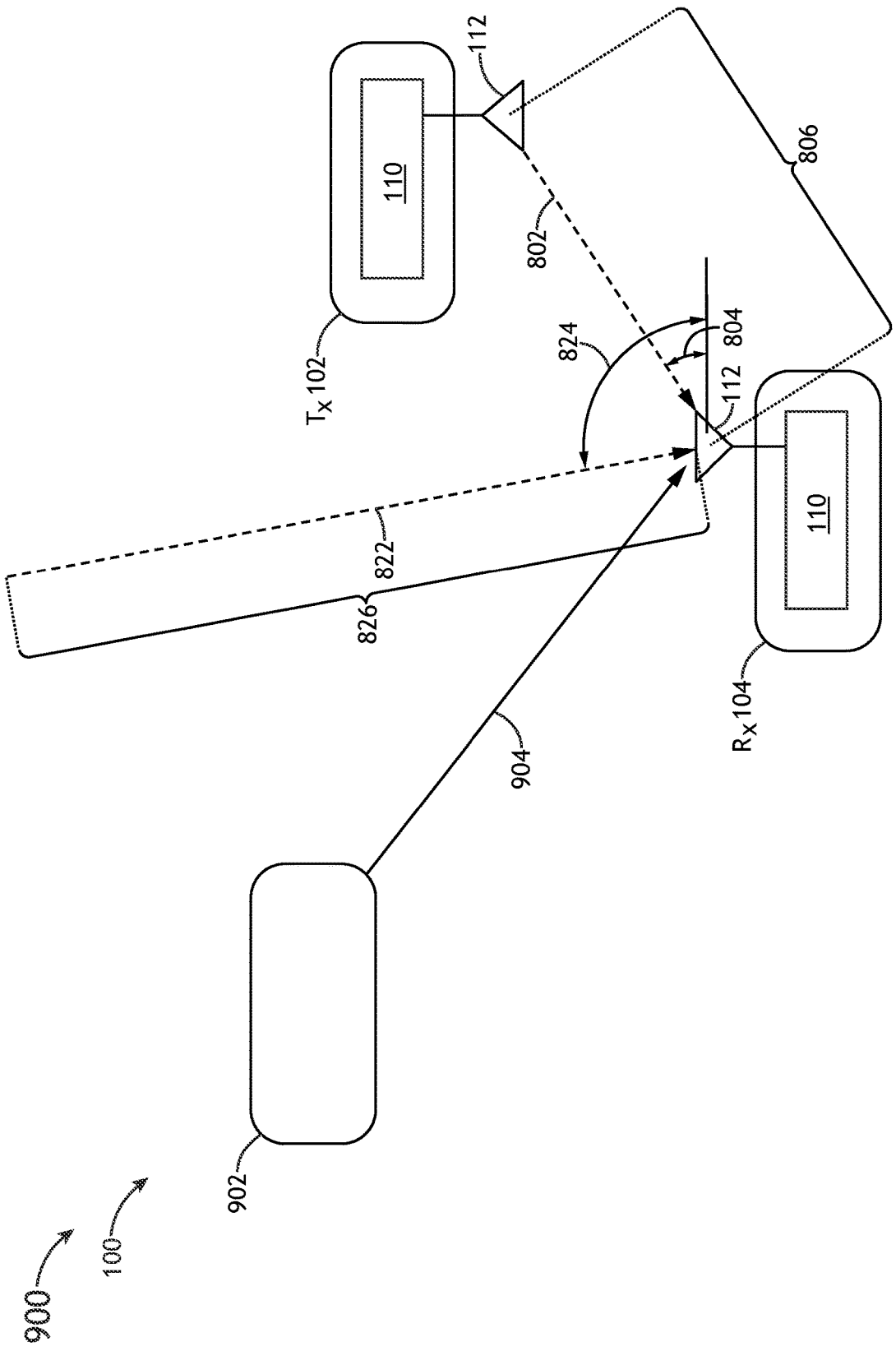
FIG. 9 is a diagrammatic illustration of the receiver node of FIG. 8 and an adversarial transmitter node and its real signals spoofing the inauthentic signals, according to example embodiments of this disclosure.

FIG. 9 is a diagrammatic illustration 900 of the receiver node 104 of FIG. 8 and an adversarial node 902 and its real signals 904 spoofing the inauthentic signals 822, according to example embodiments of this disclosure.

Figure 10:
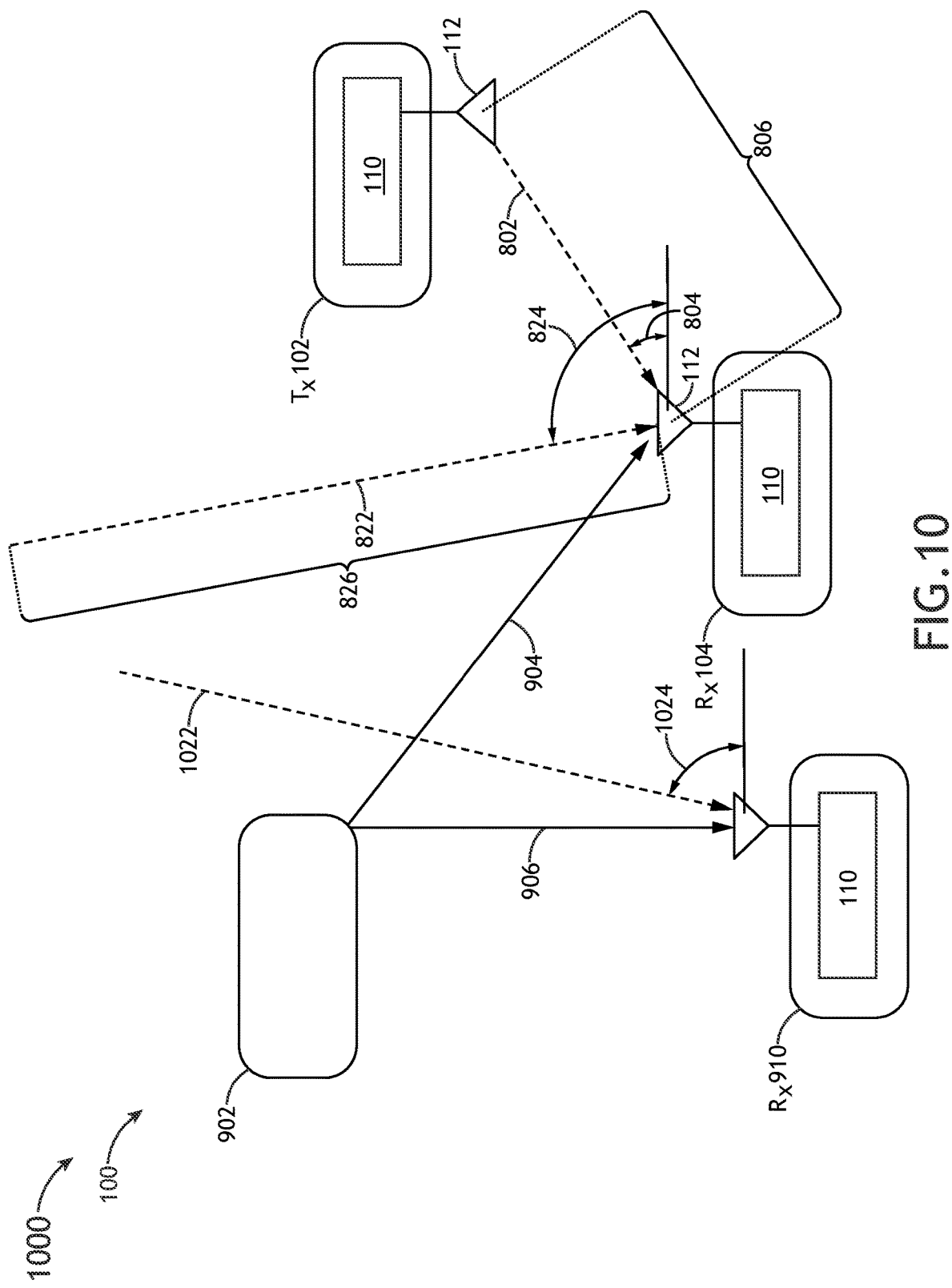
FIG. 10 is a diagrammatic illustration of the receiver node and the adversarial node of FIG. 9 as well as a second receiver node configured to determine the inauthenticity of the inauthentic signals, according to example embodiments of this disclosure.

FIG. 10 is a diagrammatic illustration 1000 of the receiver node 104 and the adversarial node 902 of FIG. 9 as well as a second receiver node 910 configured to determine the inauthenticity of the inauthentic signals 822, according to example embodiments of this disclosure.

For purposes of FIGS. 8 through 10, the inauthentic signal 822 is actually transmitted from adversarial node 902 as real signal 904 (see FIG. 10), but is spoofed (e.g., timed) to appear in the time synchronized scanning sequence of receiver node 104 as if transmitted from inauthentic bearing angle 824 and inauthentic range 826. In other words, inauthentic signal 822 is the same signal as real signal 904, 906, but illustrates (diagrammatically) the spoofed location of such a signal as received by receiver node 104. In this regard, the inauthentic signal 822 is an attempt to trick the receiver node 104 into believing the real signal 904 of FIG. 10 was sent from a different location and/or different node, such as spoofing a location of another known transmitter node (not shown). Second receiver node 910 may illustrate how a real signal 904, 906 is not able to be used to spoof the same source (not shown) for two different receiver nodes 104, 910 at the same time due to limitations in the laws of physics. It is contemplated, that at least in some embodiments, that only an authentic signal (e.g., Doppler nulling signal) may appear to have the same parameter value as corroborated by more than one receiver node 104, 910. In this regard, Doppler nulling signals may be robust to spoofing attacks.

In some embodiments, the receiver node 104 is configured to determine a parameter of the signals 802 based on the signals 802 based on the Doppler null steering. For example, the receiver node 104 may be configured to determine a relative position (e.g., bearing angle 804 and range 806) of the transmitter node 102 based on Doppler null steering as disclosed herein. For instance, the relative position may be determined via scanning sequence protocols time synced such that the time of arrival of a signal 802 of a scanning sequence may be used to determine the bearing angle 804 from which the signal 802 was sent due to when (e.g., in which time slot) in the scanning sequence it was sent. For instance, at time 0 of the scanning sequence known to both nodes 102, 104, the transmitter node may transmit a pulse of the signal 802 at a transmission angle (e.g., any angle such as East; about 135 degrees clockwise from East as shown; and/or the like) corresponding to a bearing angle 804 (e.g., 45 degrees as shown). With time margin padding between pulses longer than the maximum transmission time of the signal based on a maximum transmission range, the receiver node 104 may determine at which transmission angle, and therefore which bearing angle 804, the signal 802 came from (or should have come from if authentic).

In such a scenario, it is contemplated that due to the laws of physics, discrepancies caused by an inability to spoof all parameters of a Doppler nulling signal in all directions, limits of spatial knowledge obtainable by an adversarial node, and/or the like, that inauthentic signals (e.g., see actual signal 904, 906 spoofed as inauthentic signal 822 in FIG. 10) coming from an undesired source (e.g., interference or adversarial node 902) may be determined to be inauthentic and ignored/filtered out according to embodiments of the present disclosure. For example, it is contemplated that one or more of the following parameters of frequency offset, range 826, bearing angle 826 and/or the like of the inauthentic signal 822 may be used to determine an inauthenticity of the inauthentic signal 822, or the authenticity of an authentic signal 802.

First, consider that a source (e.g., node 902) of an inauthentic signal 822 likely wouldn't be time synchronized with the receiver node 104 to match an expected time of arrival corresponding to an expected range (e.g., range 826 in FIG. 8), and an expected bearing angle (e.g., bearing angle 824). Further, even if the adversarial node somehow was able to time synchronize with the receiver node 104, the adversarial node would need to apply Doppler corrections in such a way as to spoof the Doppler corrections (and therefore spoof the frequency offset) of the source's own motions relative to the common reference frame while also cancelling out Doppler effects of its own motions, and to do so in a way that also mimics the range delay of the source (and therefore spoof the time of arrival) while also accounting for and cancelling out its own range delay, and to do this consistently over time to spoof a relative movement of the inauthentic source (not shown). For example, such spoofing may require accurate spatial awareness of not just the source, but also the receiver node 104, and the adversarial node 902 itself. However, in at least some embodiments, a benefit of Doppler nulling methods is that receiver nodes 104 do not necessarily need to transmit Doppler nulling signals 802. In this regard, the adversarial node 902 may not know the range 826 or bearing angle 824 to the receiver node 104 needed to spoof the signal 822 from the source. In embodiments, the receiver node 104 may be configured to determine discrepancies between a calculated range (and calculated bearing angle) and an expected range 826 (and expected bearing angle 824) of any signal to determine the authenticity of the signal.

Further, even if an adversarial node had perfect spatial awareness knowledge of nodes 102, 104 and was time synchronized to mimic the time of arrival of the particular bearing angle 804 and range 826 according to a Doppler nulling scanning sequence (if such spoofing is even possible), the actual bearing angle (not labeled) of the real signal 904 would likely not match the spoofed bearing angle 824, and could therefore be used to determine the signal 822 is inauthentic. For instance, even if the time of arrival of the real signal 904 is spoofed/delayed to match the time of arrival of signal 822, the amplitude peak of the signal 904 determined via an electronically scanned antenna (ESA) of the receiver node 104 may correspond to an inauthentic bearing angle of real signal 904.

Further, in some embodiments, uncorroborated parameters (e.g., differences in spoofed source location) may be used to determine a signal 822, 1022 is inauthentic. For example, any parameter of a signal received by receiver node 104 may be compared to the same signal received by a second receiver node 910 to determine an authenticity/inauthenticity of the signal. For instance, as shown in FIG. 10, adversarial node's real signal 904, 906 received by receiver nodes 104, 910 is not able to simultaneously spoof from the same location. In other words, the inauthentic bearing angle 1024 of real signal 906 does not align with the source (not shown) at inauthentic range 826 and inauthentic bearing angle 824 as received by receiver node 104. In this regard, two or more receiver nodes 104 of a system 100 (e.g., a first receiver node and a second receiver node) may be configured to determine respective parameters of the signals 802, compare the parameters, and determine an authenticity of the signals based on the comparing.

In some embodiments, the receiver node 104 is configured to determine a parameter of the signals 802, such as signals based on the Doppler nulling as disclosed herein. For instance, the time of arrival of a signal may correspond to a bearing angle 804 according to a scanning/steering sequence configured to correspond to scanning a null angle at incremental nulling angles (e.g., every 10 degrees) repeatedly. Therefore, each time slot may correspond to receiving a signal from a transmission angle that corresponds to an inverse (e.g., 180 degrees from) the bearing angle 804. Further, a more precise analysis of the exact time of arrival of the signal 802 may correspond to a delay from an expected time of transmission (e.g., according to a protocol of the scanning sequence such as a constant delay between pulses). In this regard, the range 806 may be determined based on a difference between the expected time of transmission based on the time synchronization and the time of arrival. For instance, an estimate of the speed of transmission (c) (e.g., speed of light in Earth's atmosphere, speed of sound for sonar signals in water, etc.) may be used to calculate the range based on the time of arrival, such that range=c*(time of arrival−expected time of transmission).

In some embodiments, the receiver node 104 is configured to determine an authenticity of the signals 802 based on the parameter.

In some embodiments, the system 100 (e.g., receiver node 104) is configured to establish an explicit data transfer link between the receiver node 104 and the transmitter node 102. For example, such an explicit data transfer link may transfer explicit data (e.g., bytes of data) such as WiFi, Bluetooth, long range explicit Radio Frequency transmissions, and/or the like. In some examples, the system 100 is configured to determine an authenticity of the explicit data (e.g., data packets) of the explicit data transfer link based on the parameter. For example, a difference larger than a difference threshold (e.g., more than 10%) between an expected time of arrival, expected frequency offset, and/or the like corresponding to an expected range 806 and/or expected bearing angle 804 may be used to determine the inauthenticity/authenticity of a signal. For instance, a comparison of a calculated range based on the time synchronization and a scanning sequence to an expected range 806 of a signal 802 determined based on known relative positions of transmitter nodes 102 may be used to authenticate a signal 802. A (calculated) bearing angle based on a scanning sequence and time of arrival may also be compared to an expected bearing angle 804.

In some embodiments, the parameter comprises a frequency offset of the signals relative to a common reference frequency. For example, the frequency offset may include or be indicative of a calculated net frequency shift as disclosed in U.S. patent application Ser. No. 18/130,285, filed Apr. 3, 2023, which is herein incorporated by reference in its entirety. For example, in some embodiments of U.S. patent application Ser. No. 18/130,285, a zero value or near zero value (e.g., or the like such as a zero crossing) of a calculated net frequency shift of a received signal is used to determine a bearing angle between the source (e.g., Tx node 104) and the receiving node using a time-of-arrival of the received signal. For instance, the frequency offset may be the difference between a common reference frequency and the actual received frequency of the signals 802, or multiple values thereof. The multiple values of the frequency offset may be used to determine a transmission angle. For example, if a pulse with a frequency offset equal to a particular value and which was received in a time slot corresponding to 130 degree transmission angle from East, and a second pulse with a second frequency offset equal to a second value which is opposite the particular value is received at a second time slot corresponding to a 140 degree transmission angle, then the receiver node 104 may be configured to interpolate the two frequency offset values paired with times of arrival to determine that a 135 degree transmission angle would correspond with a zero-value transmission angle. In this regard, the receiver node 104 may use the frequency offset and time of arrival of one or more pulses of signals 802 to determine the transmission angle, which is opposite the bearing angle 804.

In some embodiments, the parameter comprises a plurality of parameters. In some embodiments, determining the authenticity includes performing a multi-parameter analysis of a plurality of parameters of the signals 802. For example, the plurality of parameters may include one or more of the following: a time of arrival; a bearing angle; and a frequency offset. For instance, a multi-parameter analysis may be any calculations configured to determine a discrepancy, inconsistency, and/or the like of the plurality of parameters. For example, a difference threshold of 5% on two or more of the plurality of parameters may be used to determine authenticity. By way of another example, an inconsistency of a parameter over time, such as a range 806 that varies back and forth, or jumps in value by more than a threshold value or percentage (e.g., 1%, 2%, 5%, 10%) over time may be indicative of an adversarial node attempting to spoof a signal 802.

For at least purposes of this disclosure, 'Doppler nulling' means 'Doppler null steering', 'Doppler null scanning', and the like.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A system comprising:
   a transmitter node and a receiver node, wherein each node of the transmitter node and the receiver node comprises:
      a communications interface comprising at least one antenna element; and
      a controller operatively coupled to the communications interface, the controller including one or more processors, wherein the controller has information of own node velocity and own node orientation;
   wherein each node of the transmitter node and the receiver node are in motion relative to each other,
   wherein each node of the transmitter node and the receiver node are time synchronized to apply Doppler corrections associated with said node's own motions relative to a common reference frame, wherein the transmitter node is configured to apply the Doppler corrections to signals using Doppler null steering along a plurality of Null directions based on the transmitter node's own motions,
   wherein the common reference frame is known to the transmitter node and the receiver node prior to the transmitter node transmitting the signals to the receiver node and prior to the receiver node receiving the signals from the transmitter node,
   wherein the receiver node is configured to determine a parameter of the signals based on the signals based on the Doppler null steering,
   wherein the receiver node is configured to determine an authenticity of the signals based on the parameter.

2. The system of claim 1, wherein the system is configured to establish an explicit data transfer link between the receiver node and the transmitter node, and wherein the system is configured to determine an authenticity of explicit data of the explicit data transfer link based on the parameter.

3. The system of claim 1, wherein the receiver node comprises a first receiver node and a second receiver node, wherein the first receiver node and the second receiver node are configured to determine respective parameters of the signals, and compare the respective parameters.

4. The system of claim 3, wherein the system is configured to determine the authenticity of the signals based on the comparing.

5. The system of claim 1, wherein the parameter comprises a time of arrival of the signals.

6. The system of claim 5, wherein the determining of the authenticity of the signals comprises:
   determining a range of the signals based on the time of arrival of the signals and the time synchronization; and
   comparing the range to an expected range.

7. The system of claim 1, wherein the parameter comprises a bearing angle of the signals.

8. The system of claim 7, wherein the determining of the authenticity of the signals comprises:
   comparing the bearing angle to an expected bearing angle.

9. The system of claim 1, wherein the parameter comprises a frequency offset of the signals relative to a common reference frequency.

10. The system of claim 1, wherein the parameter comprises a plurality of parameters of the signals, wherein determining the authenticity comprises performing a multi-parameter analysis of the plurality of parameters of the signals, the plurality of parameters comprising:
    a range based on a time of arrival;
    a bearing angle; and
    a frequency offset.

11. A system comprising:
    a receiver node comprising:
       a communications interface comprising at least one antenna element; and
       a controller operatively coupled to the communications interface, the controller including one or more processors, wherein the controller has information of own node velocity and own node orientation relative to a common reference frame;
    wherein the receiver node is time synchronized to apply Doppler corrections associated with the receiver node's own motions relative to the common reference frame, wherein the common reference frame is known to the receiver node prior to the receiver node receiving signals from a transmitter node, wherein the receiver node is configured to process the signals according to the Doppler corrections to the signals applied using Doppler null steering along a plurality of Null directions based on the transmitter node's own motions, wherein the receiver node is configured to determine a parameter of the signals based on the signals based on the Doppler null steering, wherein the receiver node is configured to determine an authenticity of the signals based on the parameter.

12. The system of claim 11, wherein the receiver node is configured to establish an explicit data transfer link between the receiver node and the transmitter node, and wherein the receiver node is configured to determine an authenticity of explicit data of the explicit data transfer link based on the parameter.

13. The system of claim 11, wherein the receiver node comprises a first receiver node and a second receiver node, wherein the first receiver node and the second receiver node are configured to determine respective parameters of the signals, and compare the respective parameters.

14. The system of claim 13, wherein the system is configured to determine the authenticity of the signals based on the comparing.

15. The system of claim 11, wherein the parameter comprises a time of arrival of the signals.

16. The system of claim 14, wherein the determining of the authenticity of the signals comprises:
determining a range of the signals based on the time of arrival of the signals and the time synchronization; and
comparing the range to an expected range.

17. The system of claim 11, wherein the parameter comprises a bearing angle of the signals.

18. The system of claim 17, wherein the determining of the authenticity of the signals comprises:
comparing the bearing angle to an expected bearing angle.

19. The system of claim 11, wherein the parameter comprises a frequency offset of the signals relative to a common reference frequency.

20. The system of claim 11, wherein the parameter comprises a plurality of parameters of the signals, wherein determining the authenticity comprises performing a multi-parameter analysis of the plurality of parameters of the signals, the plurality of parameters comprising:
a range based on a time of arrival;
a bearing angle; and
a frequency offset.

* * * * *